US012485251B2

(12) United States Patent
Berul et al.

(10) Patent No.: US 12,485,251 B2
(45) Date of Patent: Dec. 2, 2025

(54) SOFT CYLINDRICAL TORQUE TOOL FOR MEDICAL DEVICES WITH LUMEN

(71) Applicant: CHILDREN'S NATIONAL MEDICAL CENTER, Washington, DC (US)

(72) Inventors: Charles Berul, Washington, DC (US); Bradley Clark, Washington, DC (US); Morgan Loftis, Washington, DC (US); Justin Opfermann, Washington, DC (US); Paige Mass, Washington, DC (US)

(73) Assignee: CHILDREN'S NATIONAL MEDICAL CENTER, Washington, DC (US)

( * ) Notice: Subject to any disclaimer, the term of this patent is extended or adjusted under 35 U.S.C. 154(b) by 1385 days.

(21) Appl. No.: 16/893,228

(22) Filed: Jun. 4, 2020

(65) Prior Publication Data

US 2021/0001086 A1    Jan. 7, 2021

Related U.S. Application Data

(63) Continuation of application No. PCT/US2018/063892, filed on Dec. 4, 2018.
(Continued)

(51) Int. Cl.
*A61M 25/01* (2006.01)
*A61B 18/00* (2006.01)
(Continued)

(52) U.S. Cl.
CPC ...... *A61M 25/0113* (2013.01); *A61M 25/013* (2013.01); *A61B 2018/00351* (2013.01);
(Continued)

(58) Field of Classification Search
CPC ...... A61M 25/013; A61M 2025/09116; A61M 25/0113; A61M 25/09041; A61M 2025/0175; A61M 2025/0177
See application file for complete search history.

(56) References Cited

U.S. PATENT DOCUMENTS

| 4,858,810 A | 8/1989 | Intlekofer et al. |
| 5,137,517 A * | 8/1992 | Loney ............. A61M 25/09041 606/1 |

(Continued)

FOREIGN PATENT DOCUMENTS

WO    WO 2006/010929 A2    2/2006

OTHER PUBLICATIONS

International Search Report Written Opinion issued Feb. 8, 2019 in PCT/US2018/063892 filed on Dec. 4, 2018.
(Continued)

*Primary Examiner* — James D Ponton
*Assistant Examiner* — Hong-Van N Trinh
(74) *Attorney, Agent, or Firm* — Oblon, McClelland, Maier & Neustadt, L.L.P.

(57) ABSTRACT

The present disclosure is related to a device for gripping catheters that are used in interventional cardiac procedures without causing internal catheter damage. The present disclosure will allow the operator to maintain improved stability and maneuverability compared with current approaches, including, primarily, digital manipulation, which can lead to fatigue, instability and inappropriate catheter movement. Specifically in the pediatric population where small movements can lead to severe and permanent complications, the present disclosure has the potential to increase the safety profile of already high-risk interventional catheterization and electrophysiology procedures.

5 Claims, 34 Drawing Sheets

Related U.S. Application Data

(60) Provisional application No. 62/594,439, filed on Dec. 4, 2017.

(51) Int. Cl.
    *A61B 18/02*     (2006.01)
    *A61B 18/14*     (2006.01)
    *A61M 25/09*     (2006.01)

(52) U.S. Cl.
    CPC ............... *A61B 2018/00577* (2013.01); *A61B 2018/0212* (2013.01); *A61B 18/1492* (2013.01); *A61M 2025/09116* (2013.01); *A61M 2205/582* (2013.01); *A61M 2210/125* (2013.01)

(56) References Cited

U.S. PATENT DOCUMENTS

| | | | |
|---|---|---|---|
| 5,159,861 A | 11/1992 | Anderson | |
| 2005/0070820 A1* | 3/2005 | Boutillette | A61M 25/09041 604/528 |
| 2010/0211006 A1* | 8/2010 | Schmidt-Sorensen | A61M 25/09041 604/95.01 |
| 2013/0018319 A1* | 1/2013 | Abe | A61M 25/02 604/174 |
| 2013/0165863 A1 | 6/2013 | Nilson et al. | |
| 2015/0088075 A1 | 3/2015 | Khalaj | |
| 2016/0089204 A1 | 3/2016 | Chow et al. | |
| 2016/0089512 A1 | 3/2016 | Siddiqui | |

OTHER PUBLICATIONS

Extended European Search Report issued Sep. 10, 2021 in European Patent Application No. 18887195.8, 9 pages.

\* cited by examiner

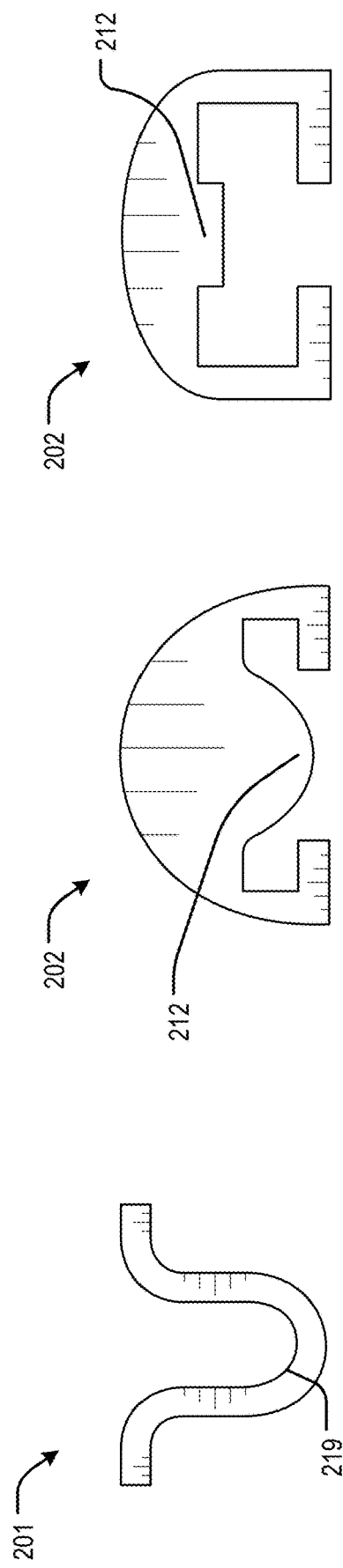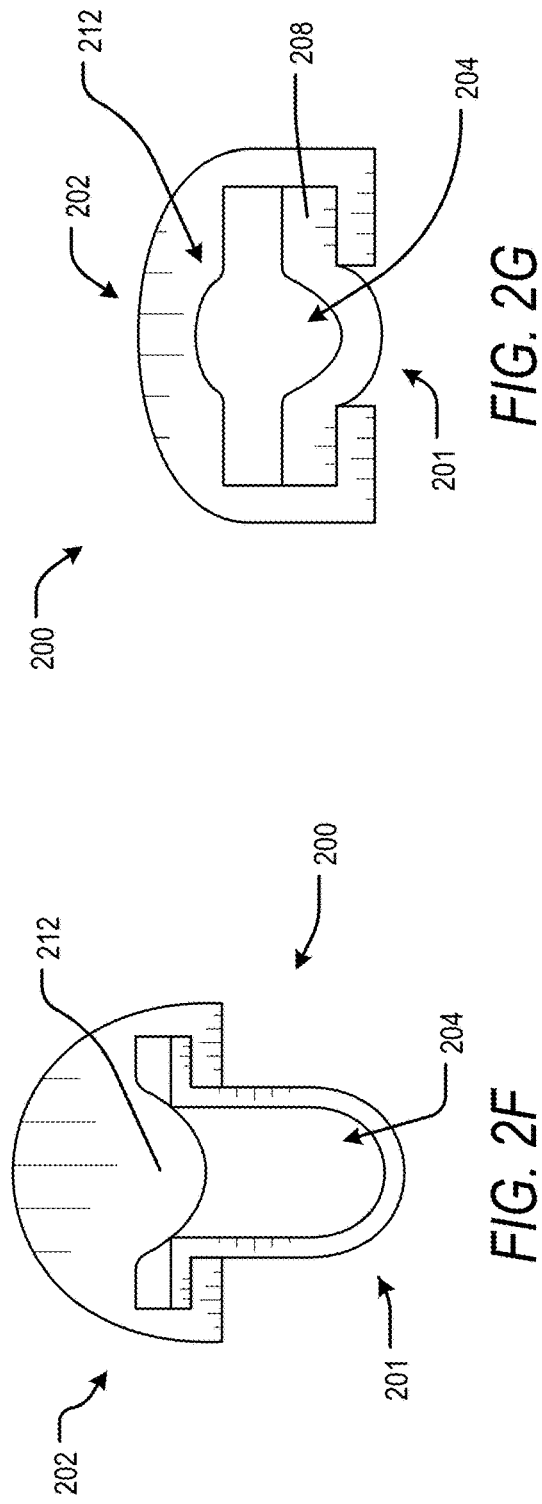

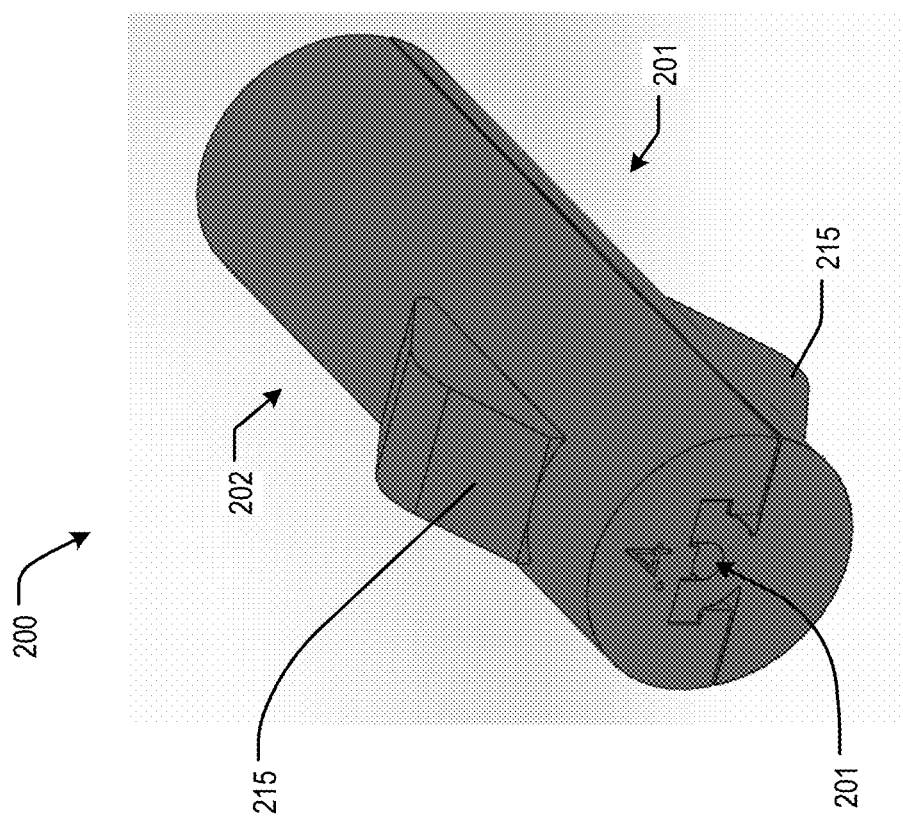

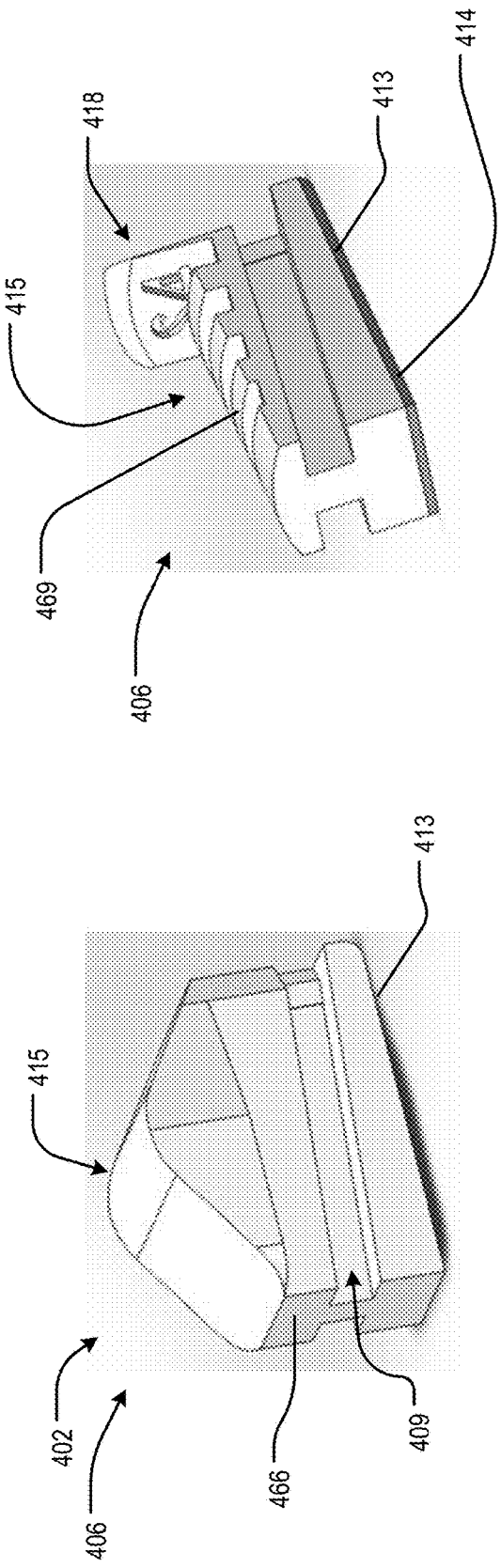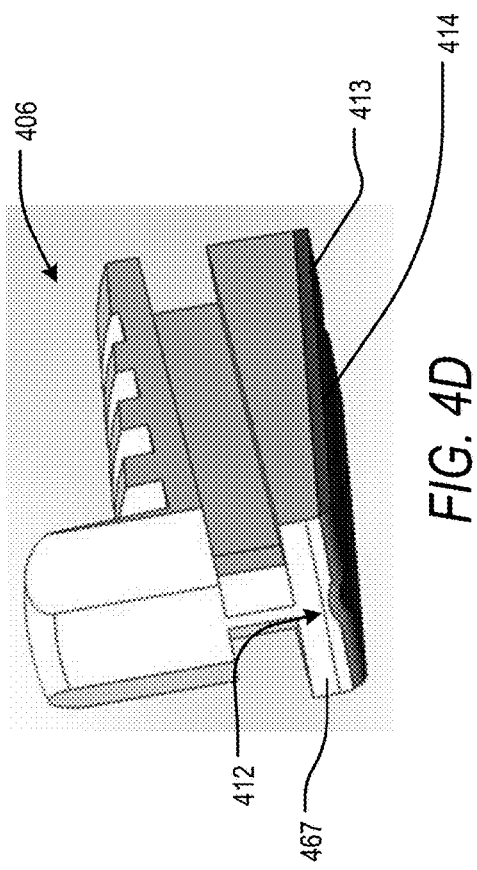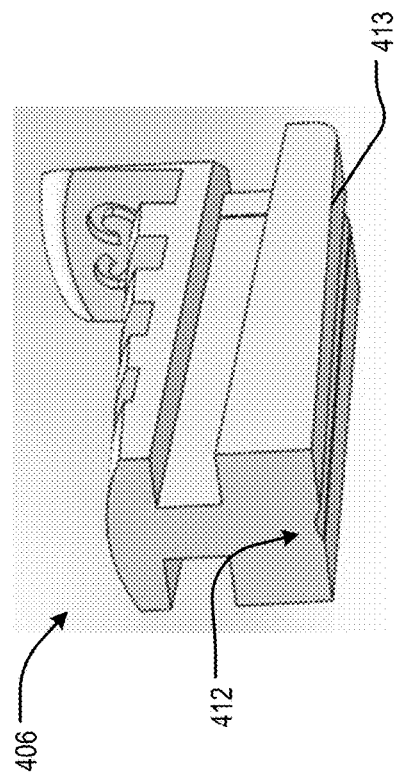
FIG. 4A
FIG. 4B
FIG. 4C
FIG. 4D

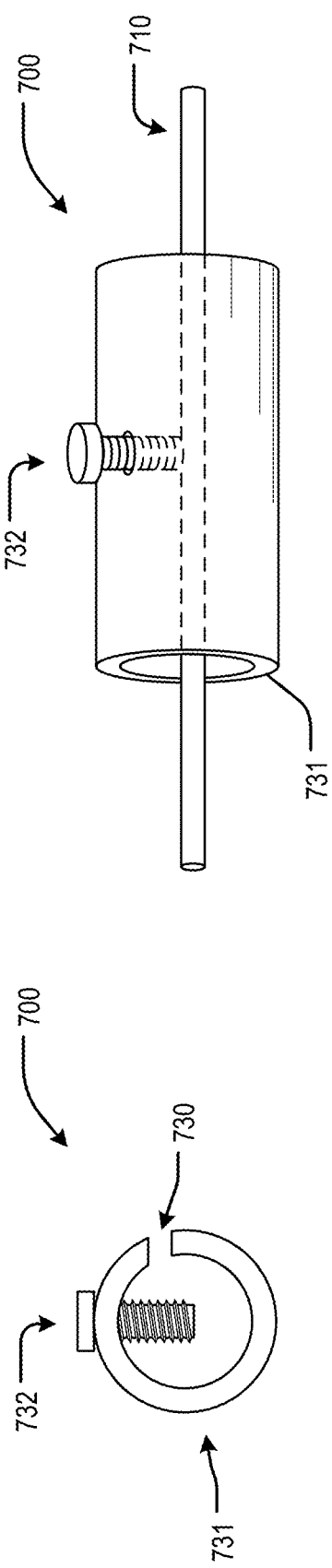
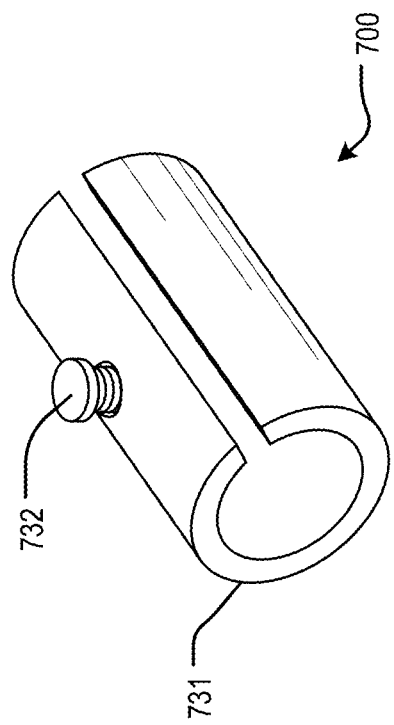
FIG. 7A
FIG. 7B
FIG. 7C

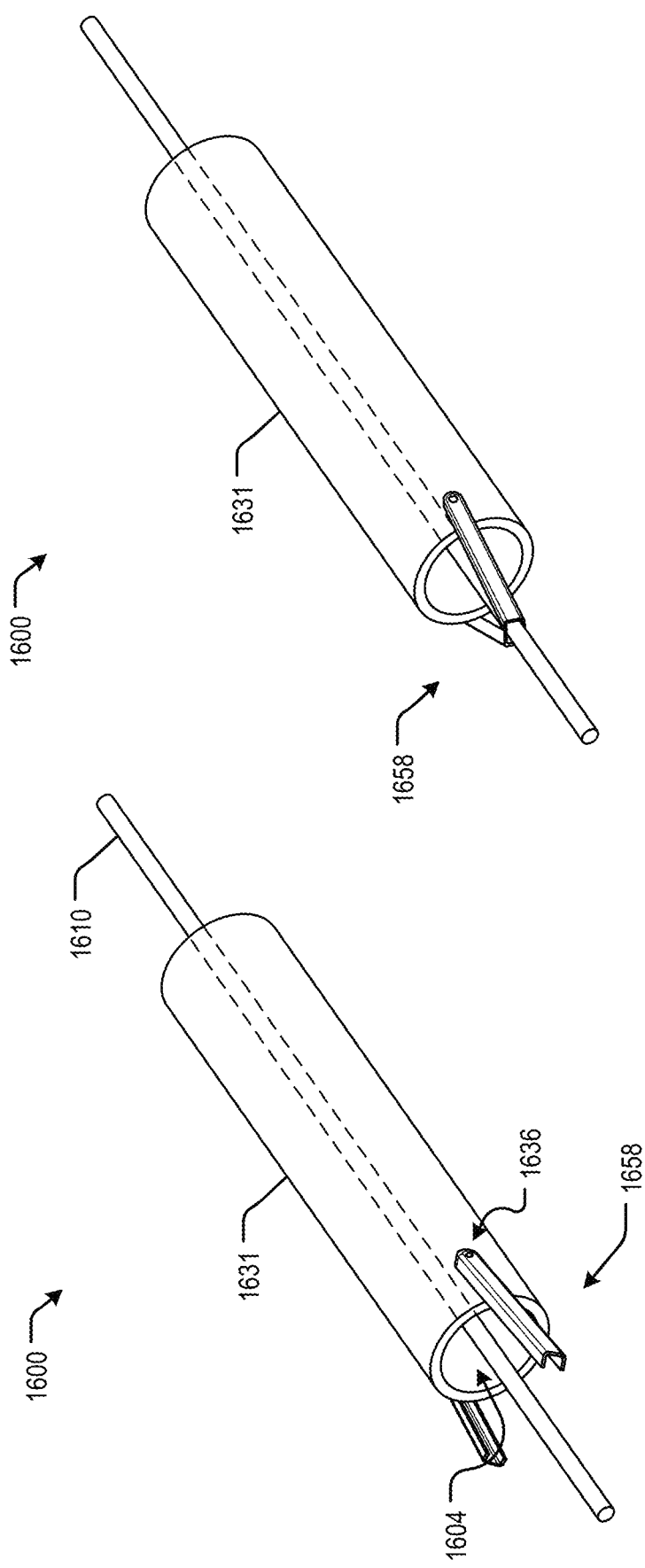

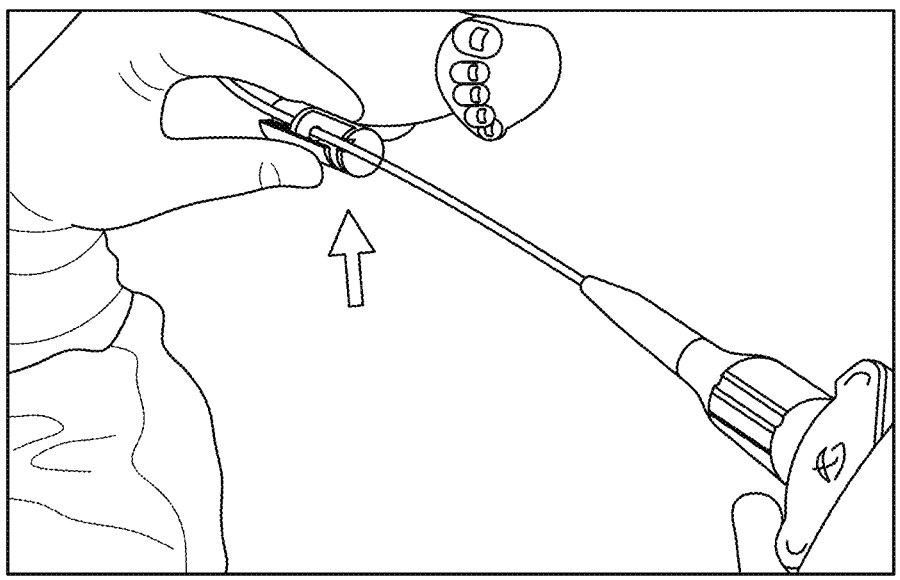
FIG. 21D
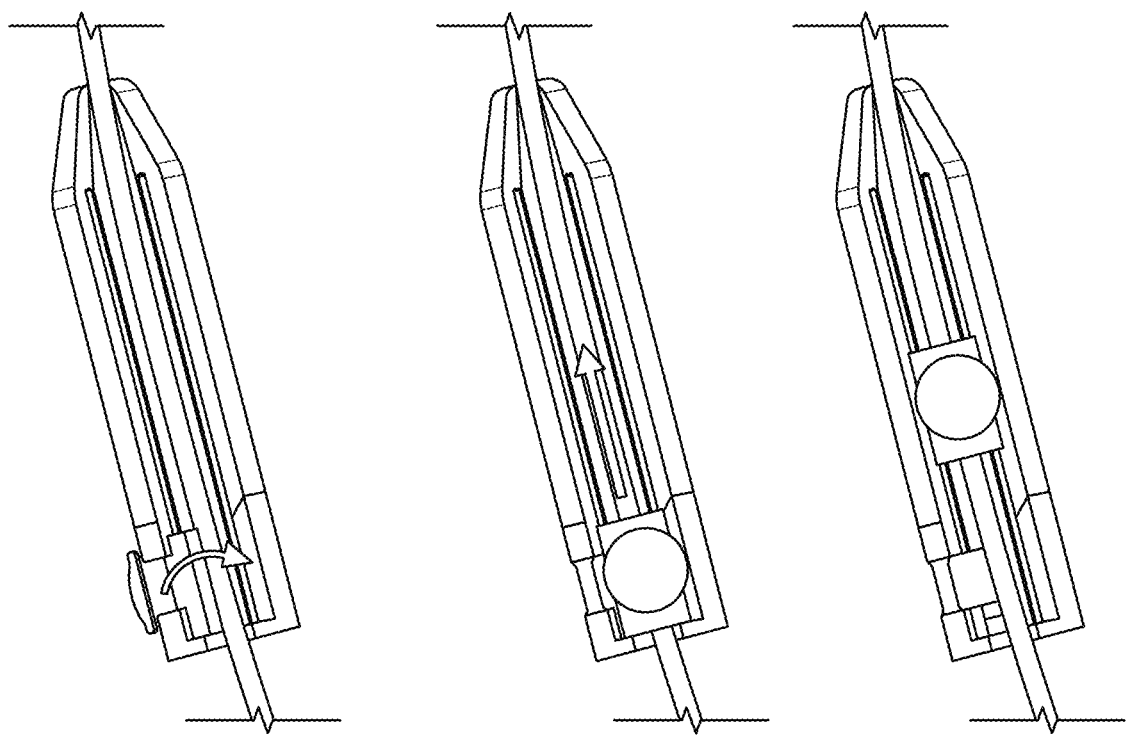
FIG. 21A
FIG. 21B
FIG. 21C

SOFT CYLINDRICAL TORQUE TOOL FOR MEDICAL DEVICES WITH LUMEN

CROSS-REFERENCE TO RELATED APPLICATIONS

The present application is a continuation of International Application No. PCT/US2018/063892, filed Dec. 4, 2018, which claims priority to U.S. Provisional Application No. 62/594,439, filed Dec. 4, 2017, the teachings of each of which are hereby incorporated by reference in their entirety for all purposes.

BACKGROUND

Field of the Disclosure

The present invention is directed to the design and application of a torque device to medical catheters and sheaths including those required for use in cardiac catheterization and electrophysiology procedures.

Description of the Related Art

The fields of interventional cardiac catheterization and electrophysiology require manual manipulation of diagnostic and therapeutic catheters and medical sheaths that are placed from outside the body into the vascular space of an individual. The catheters are manually manipulated from the shaft of the catheter or the proximal portion which may or may not contain a handle-like structure to assist in torqueing the distal end of the catheter. Currently, guidewires are often utilized in order to access certain vascular structures or portions of the cardiac anatomy. These guidewires may often not be manipulated manually using only the operator's digits and there are multiple products that assist in torqueing these guidewires. These torque devices require a substantial amount of force to be placed upon the guidewire itself to allow for proper manipulation.

Currently, there are no devices specifically designed to allow for the torqueing of diagnostic and interventional catheters. The force required to torque a guidewire is much greater than may be tolerated by a softer catheter thus causing either damage to the internal workings of the catheter or limiting liquid flow within the lumen of a cardiac catheterization catheter or medical sheath that would create difficulty with pressure diagnostics or the infusion or withdraw of biologics.

Diagnostic and therapeutic catheters required digital manipulation by a human operator. The movement of the distal portion of the catheter is limited by the digital maneuverability of the operator and can create further ergonomic difficulties. A soft cylindrical device that has the capability to torque a catheter would improve maneuverability for the operator and has the potential to improve the safety profile by limiting slippage between an operator's digits, especially in the case of a catheter that provides therapy to the vasculature or endocardial surface of the heart.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

SUMMARY

The present disclosure relates to an apparatus for controlling a cylindrical medical device, comprising a bottom component having a working channel and one or more fingers comprising a sliding track, each of the one or more fingers having a top surface, a side surface, and a bottom surface, and a top component having one or more slots corresponding to the one or more fingers comprising the sliding track, the top component being slidable along the sliding track, wherein the sliding track comprising gradations along the top surface of each of the one or more fingers, said gradations allowing the top component to reversibly slide in a step-wise manner from a rearward end of the apparatus to a forward end of the apparatus, the sliding track is declined from the rearward end of the bottom component to the forward end of the bottom component, a distance from a bottom surface of each of the one or more fingers to a surface of the working channel decreasing, accordingly, along a working axis of the bottom component, and the top component, upon being slid along the sliding track from the rearward end of the apparatus to the forward end of the apparatus, is frictionally engaged with the cylindrical medical device, said cylindrical medical device being secured therein.

The present disclosure further relates to an apparatus for controlling a cylindrical medical device, comprising a bottom component having a working channel and one or more fingers comprising a sliding track, each of the one or more fingers having a top surface, a side surface, and a bottom surface, and a top component having one or more slots corresponding to the one or more fingers comprising the sliding track, the top component being slidable along the sliding track, wherein the sliding track comprising gradations along the top surface of each of the one or more fingers, said gradations allowing the top component to reversibly slide in a step-wise manner from a rearward end of the apparatus to a forward end of the apparatus, the sliding track is declined from the rearward end of the bottom component to the forward end of the bottom component, a distance from a bottom surface of each of the one or more fingers to a surface of the working channel decreasing, accordingly, along a working axis of the bottom component, the top component, upon being slid along the sliding track from the rearward end of the apparatus to the forward end of the apparatus, is frictionally engaged with the cylindrical medical device, said cylindrical medical device being secured therein, the top component includes an engaging surface, said engaging surface defining an engaging aspect of the top component, said engaging aspect being a depression having a curved shape along a cross section, and the surface of the working channel of the bottom component defines a working channel feature, said working channel feature being a depression having a curved shape along a cross section.

The present disclosure further relates to an apparatus for controlling a cylindrical medical device, comprising a bottom component having a working channel and one or more fingers comprising a sliding track, each of the one or more fingers having a top surface, a side surface, and a bottom surface, and a top component having one or more slots corresponding to the one or more fingers comprising the sliding track, the top component being slidable along the sliding track, wherein the top component, upon being slid along the sliding track from the rearward end of the apparatus to the forward end of the apparatus, is frictionally engaged with the cylindrical medical device, said cylindrical medical device being secured therein, the top component includes an engaging surface, said engaging surface defining an engaging aspect of the top component, said engaging aspect being a depression having a curved shape along a cross section, and a surface of the working channel of the bottom component defines a working channel feature, said working channel feature being a depression having a curved shape along a cross section.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 2C is a schematic of a first component of a torque tool, according to an exemplary embodiment of the present disclosure;

FIG. 2D is a schematic of a second component of a torque tool, according to an exemplary embodiment of the present disclosure;

FIG. 2E is a schematic of a second component of a torque tool, according to an exemplary embodiment of the present disclosure;

FIG. 2F is a schematic of a torque tool, according to an exemplary embodiment of the present disclosure;

FIG. 2G is a schematic of a torque tool, according to an exemplary embodiment of the present disclosure;

FIG. 2J is an illustration of a torque tool, according to an exemplary embodiment of the present disclosure;

FIG. 4A is an illustration of a second component of a torque tool, according to an exemplary embodiment of the present disclosure;

FIG. 4B is an illustration of a second component of a torque tool, according to an exemplary embodiment of the present disclosure;

FIG. 4C is an illustration of a second component of a torque tool, according to an exemplary embodiment of the present disclosure;

FIG. 4D is an illustration of a second component of a torque tool, according to an exemplary embodiment of the present disclosure;

FIG. 7A is a schematic of a view of a torque tool, according to an exemplary embodiment of the present disclosure;

FIG. 7B is a schematic of a view of a torque tool, according to an exemplary embodiment of the present disclosure;

FIG. 7C is a schematic of a perspective view of a torque tool, according to an exemplary embodiment of the present disclosure;

FIG. 16A is a schematic of a torque tool in an open position, according to an exemplary embodiment of the present disclosure;

FIG. 16B is a schematic of a torque tool in a closed position, according to an exemplary embodiment of the present disclosure;

FIG. 21A is an image of a torque tool in an open state, according to an exemplary embodiment of the present disclosure;

FIG. 21B is an image of a torque tool in a closed, inactive state, according to an exemplary embodiment of the present disclosure;

FIG. 21C is an image of a torque tool in a closed, active state, according to an exemplary embodiment of the present disclosure;

FIG. 21D is an image of a torque tool being implemented about a catheter, according to an exemplary embodiment of the present disclosure;

DETAILED DESCRIPTION

Figure 1A:
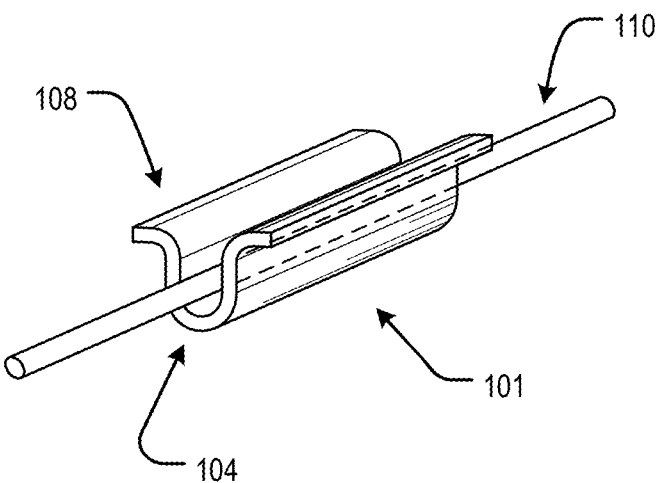
FIG. 1A is a schematic of a first component of a torque tool, according to an exemplary embodiment of the present disclosure.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

Each year, thousands of infants and children will develop cardiac rhythm disorders that result in the heart beating too fast. These rhythm disorders, or arrhythmias, most often originate from within the heart muscle itself, resulting in palpitations, dizziness/sudden fainting episodes, and diminished function of the heart over time. The current standard of care in children is for pediatric electrophysiologists to diagnose and treat these arrhythmias through a procedure called ablation. Catheters that provide both diagnostic and pacing information, in addition to being able to deliver therapy, are inserted into the patient's vasculature. A 3-dimensional map of the heart can then be created by manually manipulating a mapping catheter throughout the structures of the heart. Subsequent diagnostic catheters can then be placed within different internal cardiac structures.

Following certain diagnoses, an ablation procedure may provide a cure to patients by creating a lesion, through cryoablation (freezing) or radiofrequency (burning) energy, within the interior structures of the heart, thus destroying the focus of the arrhythmia. To this end, the ablation catheter can be placed at a point of interest. In order to maintain contact with the point of interest, the electrophysiologist may be required to provide manual torque to keep the catheter in the correct position while maintaining adequate contact with the heart muscle, throughout the entirety of lesion creation which is often several minutes.

Traditionally, to accomplish this, a pediatric electrophysiologist must manipulate each of the catheters, from outside the body, controlling their position within the heart by pinching and torqueing the catheters between their thumb and forefinger. Such ablation procedures, however, can require the placement of multiple ablation lesions within the heart to fully provide an effective cure. Moreover, catheter movement during ablation, even 1-2 mm, can risk creating unwanted lesions and damage to important structures, including the normal electrical system of the heart. This can result in the need for additional procedures and, in some cases, the placement of a pacemaker to supplement the damaged electrical system. In adolescents, children, and infants, where there is even less room to maneuver and higher risk of collateral damage, the risk of catheter movement and complications is expounded.

Poor ergonomics further complicate this procedure, by creating unnecessary fatigue for operators. Catheters can often be small in size (1-3mm diameter), making controlled manipulation of the catheters from outside of the body complex, especially in cases when soft polymers are used. For example, the force required by the operator to pinch the catheter for manipulation is often force in excess of that which the catheter can withstand without collapsing. As the manipulation process is repeated for multiple lesions, the operator's fingers may become fatigued, resulting in an increasing risk of catheter slip in future lesions.

According to an embodiment, the present disclosure is a catheter torque tool that improves the safety profile for cardiac ablation and reduces user fatigue by creating a larger surface area for gipping the catheter, thus improving the ergonomics and control of the catheter. The torque tool is designed in order to affix to a catheter without crushing the internal electronics. The potential to create a more stable catheter environment may have a profound impact on the outcomes of such procedures in children by eliminating catheter slip and improving the delivery of ablation therapies.

To this end, and with reference now to the Figures, it can be appreciated that friction between a torque tool and a catheter therein provides the main force for holding the catheter, or other medical device, within the working channel of the torque tool. Moreover, it can be appreciated that, although the torque tool described herein is suitable for catheters or other medical devices of substantial material stiffness, the torque tool, as described, is uniquely suited to catheters or other medical devices of reduced material stiffness. In an example, the catheter or other medical device can be fabricated of a soft polymer. For brevity, though the torque tool can be applied to a variety of medical devices having a variety of material properties, the Figures herein will be described with reference to a catheter having, as a material property, a soft Young's modulus, such as a silicone rubber or other elastomer.

Figure 1B:
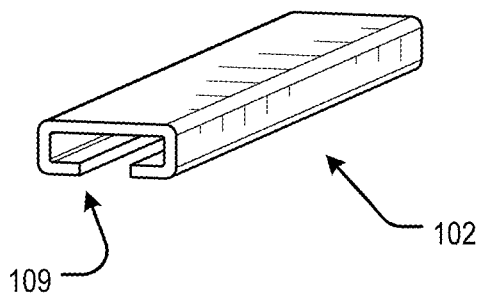
FIG. 1B is a schematic of a second component of a torque tool, according to an exemplary embodiment of the present disclosure.
Figure 1C:
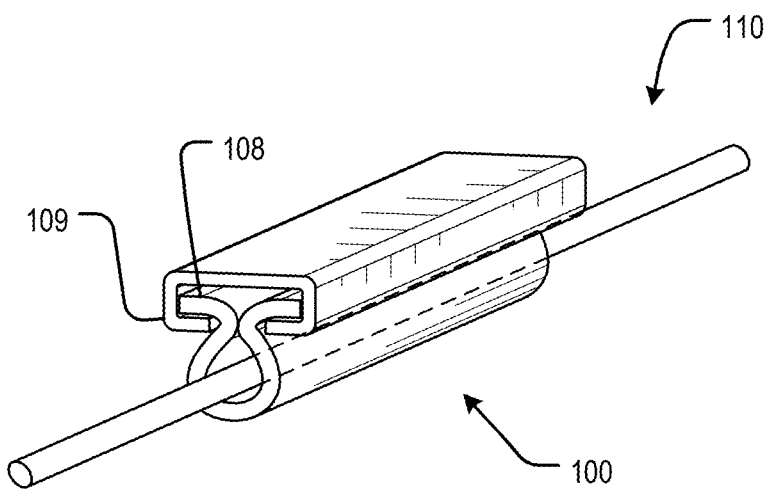
FIG. 1C is a schematic of a torque tool, according to an exemplary embodiment of the present disclosure.

According to an embodiment, FIG. 1A to FIG. 1C describe a system that exploits the above-described frictional relationship. Generally, FIG. 1A to FIG. 1C describe a torque tool having a top component and a bottom component that use a sliding feature for reversible coupling. In particular, FIG. 1A is a bottom component 101 of the torque tool. The bottom component 101 can be generally U-shaped with a working channel 104 formed therein. The bottom component 101 can be sized and shaped according to an application. In an example, wherein the application is a small diameter catheter, the size of the bottom component 101, and the working channel 104 therein, is necessarily small. In another example, wherein the bottom material 101 is a flexible material, the size of the bottom component 101 is fixed and minor changes, for example, in catheter diameter can be accommodated by the material properties of the bottom component 101. One or more opposing fingers 108 can be disposed at an upper end of the bottom component 101 for engagement with a corresponding one or more slots 109 of a top component 102 of the torque tool, shown in FIG. 1B. The top component 102 can be substantially rectangular, for instance, having a void formed between the one or more slots 109. During operation, said void becomes occupied by an aspect of the bottom component 101. For instance, after placing the catheter 110 within the working channel 104 of the bottom component 100, the one or more opposing fingers 108 can be inserted into the corresponding one or more slots 109 of the top component 102 of the torque tool 100, as shown in FIG. 1C. The design of the torque tool 100 and the arrangement of the one or more opposing fingers 108 of the bottom component 101 within the corresponding one or more slots 109 of the top component 102 prevent independent vertical movement of the components. The top component 102 can, however, be slid along the length of the bottom component 101. In an embodiment, the one or more opposing fingers 108, extending the length of the torque tool 100, define a sliding track. Further, coupling the top component 102 to the bottom component 101 brings the one or more opposing fingers 108 of the bottom component 101 proximate one another. This allows for maximum contact by an interior surface of the bottom component 101 of the torque tool 100 with the catheter 110. Increasing the contact area between the catheter 110 and the torque tool 100 allows for increased frictional control of the catheter 110 without excessive compression of the catheter 110.

According to an embodiment, the bottom component 101 can be fabricated of a resilient material such as, for instance, a soft silicone or other elastomer. In an embodiment, the top component 102 can be fabricated of a material having, for example, increased mechanical properties and being implementable in a medical space, such as a biocompatible plastic or metal. During implementation, the soft material of the bottom component 101 in combination with the relatively rigid material of the top component 102 can prevent slippage of the catheter 110 through the torque tool 100.

According to an embodiment, the torque tool 100 can be fabricated for a range of catheter sizes or can be fabricated as a universal tool. In an example, the torque tool 100 can be fabricated such that a catheter ranging from 3 to 34 French can be accommodated by a single tool. In another example, a multitude of torque tools can be fabricated for each, or a combination of, catheter size from 3 to 34 Fr.

Figure 2A:
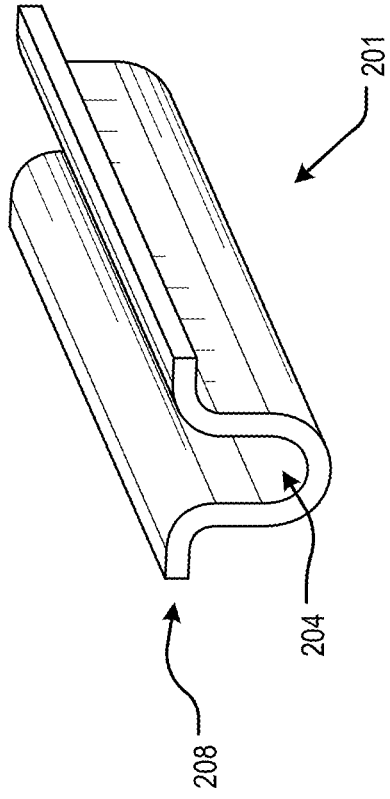
FIG. 2A is a schematic of a first component of a torque tool, according to an exemplary embodiment of the present disclosure.

According to an embodiment, FIG. 2A to FIG. 2N are illustrations and computer-aided design (CAD) drawings of a plurality of variations of the design presented in FIG. 1A to FIG. 1C.

In an embodiment, FIG. 2A is a bottom component 201 of the torque tool. The bottom component 201 can be generally U-shaped with a working channel 204 formed therein, as described with reference to FIG. 1A. Similarly, one or more opposing fingers 208 can be disposed at an upper end of the bottom component 201 for engagement with a corresponding one or more slots 209 of a top component 202 of the torque tool, shown in FIG. 2B.

Figure 2B:
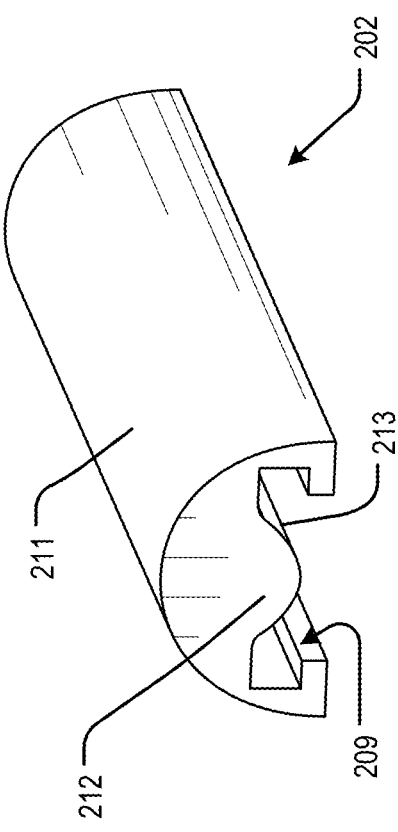
FIG. 2B is a schematic of a second component of a torque tool, according to an exemplary embodiment of the present disclosure.
Figure 2I:
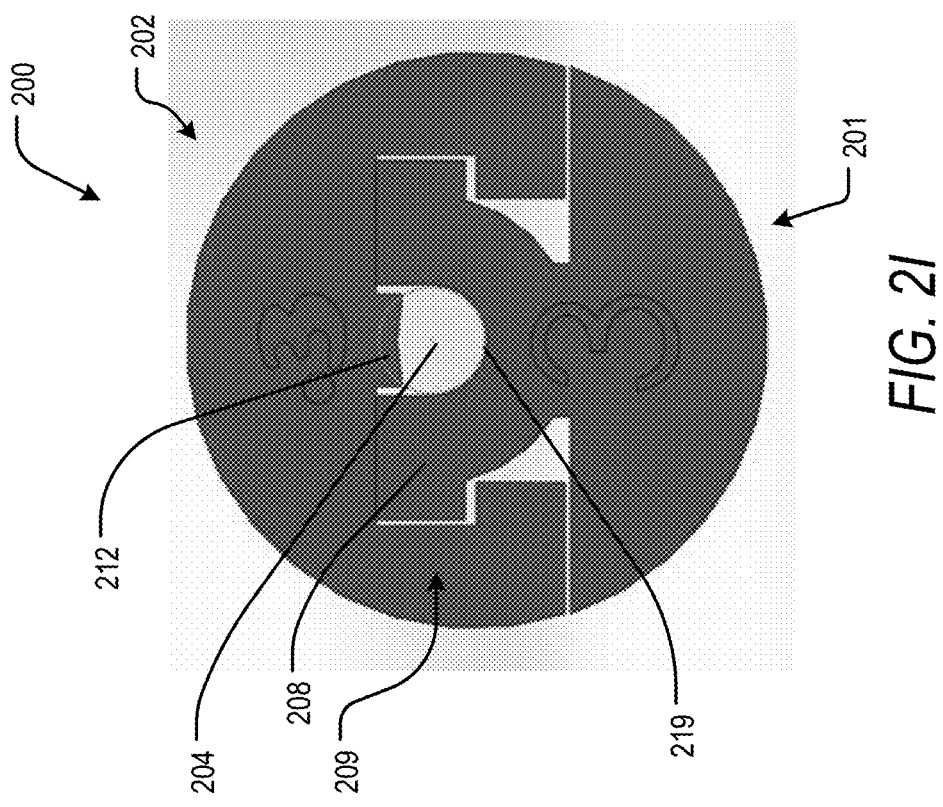
FIG. 2I is an illustration of a torque tool, according to an exemplary embodiment of the present disclosure.

Distinct from the top component of FIG. 1B, the top component 202 of FIG. 2B has a catheter engaging aspect 212, having a catheter engaging surface 213, on an inferior surface of an upper part 211 of the top component 202. The catheter engaging aspect 212 can be designed for frictional contact of a catheter placed within the working channel 204 of the bottom component 201. Moreover, the catheter engaging aspect 212 allows for increased pressure application to the catheter, thereby applying increasingly circumferential pressure to control the catheter. In an embodiment, and as shown in FIG. 2B, the catheter engaging aspect 212 can be a protrusion from the upper part 211 of the top component 202 and the catheter engaging surface 213 of the catheter engaging aspect 212 can be a curved surface. In an example, the catheter engaging surface 213 can be parabolic about a working axis of the torque tool. Further, a protrusion height of the catheter engaging aspect 212 can be determined, in part, relative to the size of the working channel 204 of the bottom component 201 and a diameter of the catheter placed therein.

According to an embodiment, the bottom component 201 can be fabricated of a resilient material such as, for instance, a soft silicone or other elastomer. In an embodiment, the top component 202 can be fabricated of a material having, for example, increased mechanical properties and being implementable in a medical space, such as a biocompatible plastic or metal. During implementation, the soft material of the bottom component 201 in combination with the relatively rigid material of the top component 202 can prevent slippage of the catheter through the torque tool.

In view of FIG. 2A, FIG. 2C is a cross-sectional schematic of the bottom component of the torque tool. In particular, FIG. 2C highlights a working channel surface 219 of the bottom component 201, wherein the working channel surface 219 has a generally U-shaped contour suitable for providing maximal contact with a catheter placed therein.

FIG. 2D and FIG. 2E are cross-sectional schematics of the top component of the torque tool. In particular, FIG. 2D and FIG. 2E describe a catheter engaging aspect 212 of the top component 202. In an embodiment, the catheter engaging aspect 212 can be a projection from a body of the top component 202, the projection extending into the working channel of the torque tool. The catheter engaging aspect 212 can be a variety of contours including triangular, curvilinear (as shown in FIG. 2D), rectangular (as shown in FIG. 2E), and the like. In another embodiment, the catheter engaging aspect 212 can be a depression within the body of the top component 212. In either scenario, by providing the catheter engaging aspect 212, maximal contact area with a catheter placed within a working channel of the torque tool can be achieved. Indeed, this allows for maximum contact between the torque tool and the catheter. Increasing the contact area between the catheter and the torque tool allows for increased frictional control of the catheter without excessive compression of the catheter. In an example, excessive compression of the catheter may increase impedance of an electrical signal transmitted therethrough.

FIG. 2F and FIG. 2G are illustrations of a torque tool having a bottom component and a top component designed for maximal contact with a catheter positioned therebetween. With reference to FIG. 2F, a torque tool 200 comprises a top component 202 having a catheter engaging aspect 212 and a bottom component 201. The bottom component 201 can be described similarly to the bottom component 201 of FIG. 2C. The catheter engaging aspect 212 of the top component 202 features a protrusion from the body of the top component 202 for contact with a catheter positioned within a working channel 204 of the bottom component 201. During use, as the top component 202 is slid over the bottom component 201 of the torque tool 200, a catheter within the working channel 204 can be pinched by the catheter engaging aspect 212 and pressure can be applied therein.

FIG. 2G illustrates another embodiment of the torque tool wherein the working channel is meant to reflect the geometry of the catheter therein. For example, with reference to FIG. 2G, a torque tool 200 can have a top component 202 and a bottom component 201. The top component 202 can have a catheter engaging aspect 212, wherein the catheter engaging aspect 212 is a depression within the body of the top component 202. In addition, the bottom component 201 can be modified such that a dimension of the bottom component 201 is shortened, thereby bringing a basal end of the bottom component 201 in proximity to one or more opposing fingers 208 of the bottom component 201. This basal end of the bottom component 201, therefore, creates a semi-circular-like shape that can be aligned with the catheter engaging aspect 212 of the top component 202, the catheter engaging aspect 212 having, in an example, a corresponding semi-circular-like shape to the bottom component 201. During use, a catheter within a working channel 204 of the torque tool can be in nearly circumferential contact with the surfaces of the top component 202 and the bottom component 201 of the torque tool.

In view of FIG. 2F, FIG. 2H-FIG. 2J provide computer aided design illustrations of a torque tool, wherein the torque tool features corresponding features of the top component and the bottom component.

Figure 2H:
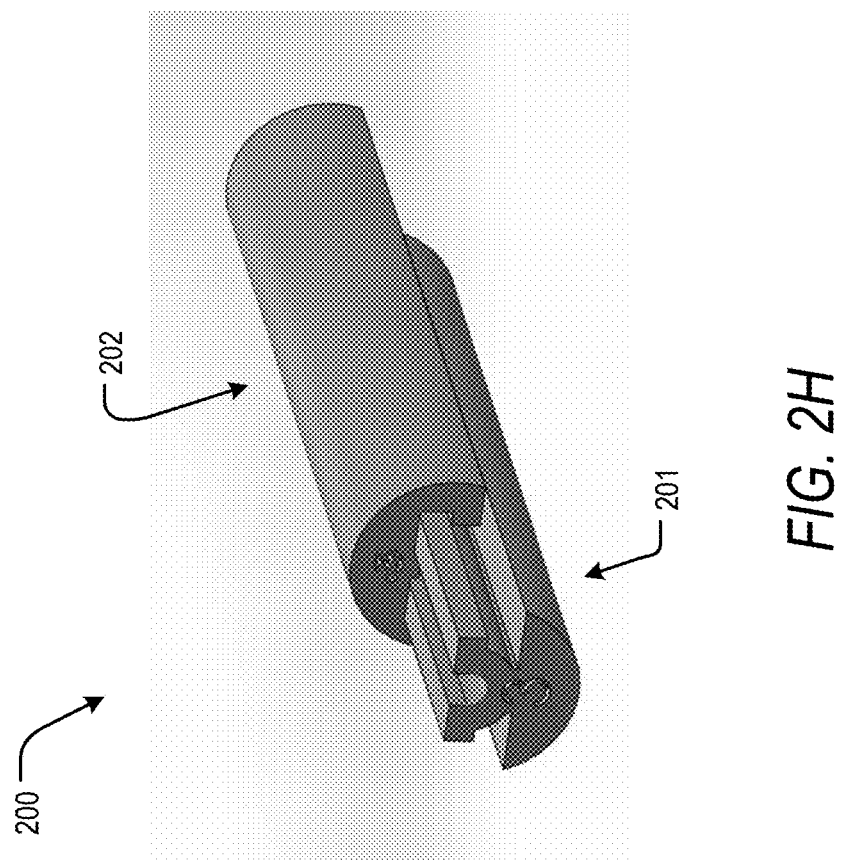
FIG. 2H is an illustration of a torque tool, according to an exemplary embodiment of the present disclosure.

FIG. 2H is an illustration of a perspective view of a torque tool 200 of the present disclosure. The torque tool 200 includes a top component 202 and a bottom component 201 that can slide together to form, for example, a circular body. As shown in the cross-sectional illustration of the torque tool 200 in FIG. 2I, the top component 202 has one or more slots 209 and a catheter engaging aspect 212, the catheter engaging aspect 212 being a depression formed within the body of the top component 202. The depression formed within the body of the top component 202 resembles the depression of top component of FIG. 2G and aims to maximize contact area between the torque tool and the catheter. A catheter engaging surface of the depression can have one of a variety of contours including hemispherical, triangular, rectangular, and the like, and can be aligned with the depression of the top component 202. The bottom component 201 can have one or more opposing fingers 208 for slidably-coupling with the one or more slots 209 of the top component 202. Moreover, a surface 219 of a working channel 204 of the torque tool 200 is shaped in order to, in combination with the catheter engaging aspect 212 of the top component 202, maximize contact area between the catheter and both components of the torque tool 200. In an example, when assembled, the diameter of the working channel 204 of the torque tool 200 is relatively smaller than a selected size of a catheter of an operation, thereby ensuring that the catheter will be circumferentially controlled within the working channel 204 after the two components are slid together.

It can be appreciated that for each of the cross-sectional schematics above, the described features can, for instance, extend the entire length of the component. In this way, as the top component 202 is slid over the bottom component 201, for instance, contact between the catheter engaging aspect 212 and the catheter is increased along the length.

FIG. 2J provides another illustration of an embodiment of a torque tool according to the present disclosure, however, the torque tool 200 of FIG. 2J includes at least one tactile feature 215. In an example, the at least one tactile feature 215 can be disposed on a surface of a top component 202 and a surface of a bottom component 201 of the torque tool 200. By providing tactile features on the surface of the torque tool 200, the user is able to improve handling of the torque tool 200, and the catheter secured therein, during an operation. In addition to providing improved control of the torque tool 200 during manipulations, the tactile feature 215 allows for easier sliding of the top component 202 relative to the bottom component 201 during securing of the catheter within the working channel 204.

Figure 2L:
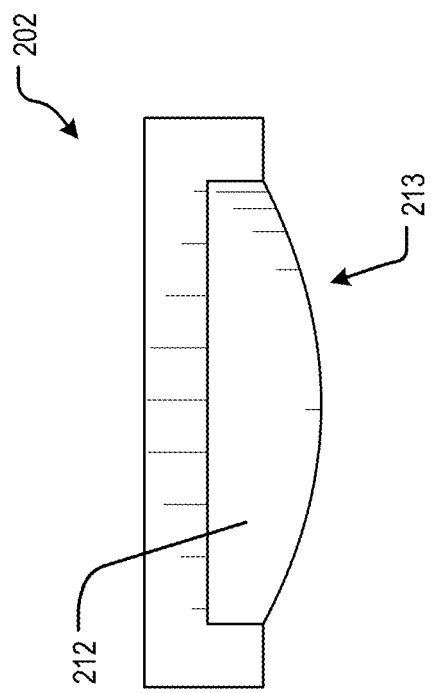
FIG. 2L is a schematic of a second component of a torque tool, according to an exemplary embodiment of the present disclosure.
Figure 2K:
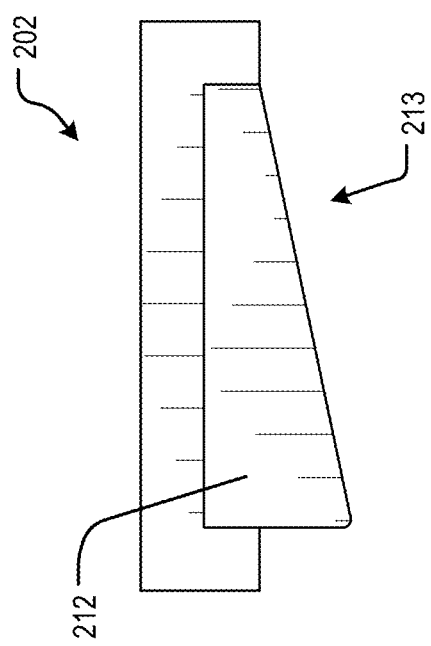
FIG. 2K is a schematic of a second component of a torque tool, according to an exemplary embodiment of the present disclosure.

FIG. 2K and FIG. 2L provide illustrations of embodiments of the top component of the torque tool of the present disclosure. In particular, FIG. 2K and FIG. 2L describe a top component 202 having a catheter engaging aspect 212 extending from the top component 202. The catheter engaging aspect 212 of FIG. 2K has, for example, a catheter engaging surface 213 defining a thickness dimension of the catheter engaging aspect 212 that is greater at one end than the other. By varying the thickness of the catheter engaging aspect 212, it can be made possible catheters of varying sizes to be secured within a working channel of the torque tool, as a larger diameter catheter may be secured at an end where the thickness is minimal and a smaller diameter catheter may be secured at an end where the thickness is greater. In a different way, but to a similar end, the catheter engaging aspect 212 of the top component 202 of FIG. 2L has a catheter engaging surface 213 defining a thickness dimension of the catheter engaging aspect 212 that is curved along a cross-section and is maximal at a central position. In an example, the catheter engaging aspect 212 is fabricated of a softer material that allows the catheter engaging aspect 212 to deflect when a catheter is inserted, changing shape in response to the size of the catheter and thereby increasing contact area between the catheter engaging surface 213 and the catheter in the working channel of the torque tool.

FIG. 3A to FIG. 5C, are illustrations of embodiments of the torque tool of the present disclosure, in view of the above-described.

Figure 3B:
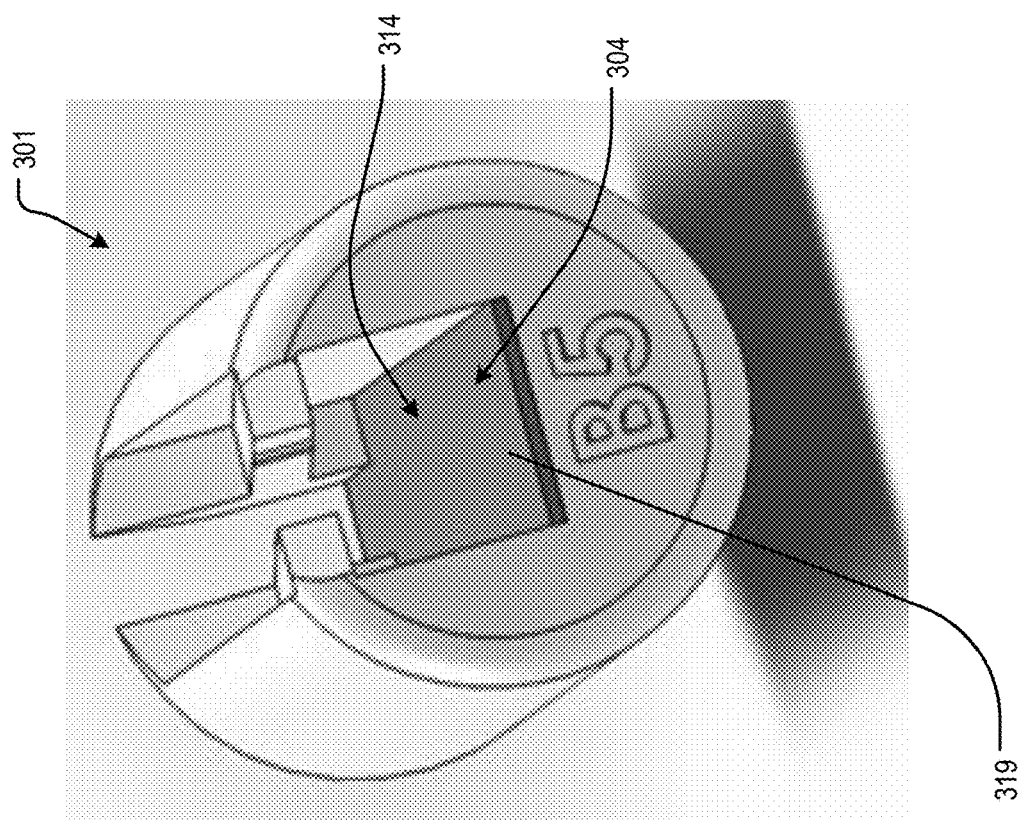
FIG. 3B is an illustration of a first component of a torque tool, according to an exemplary embodiment of the present disclosure.
Figure 3A:
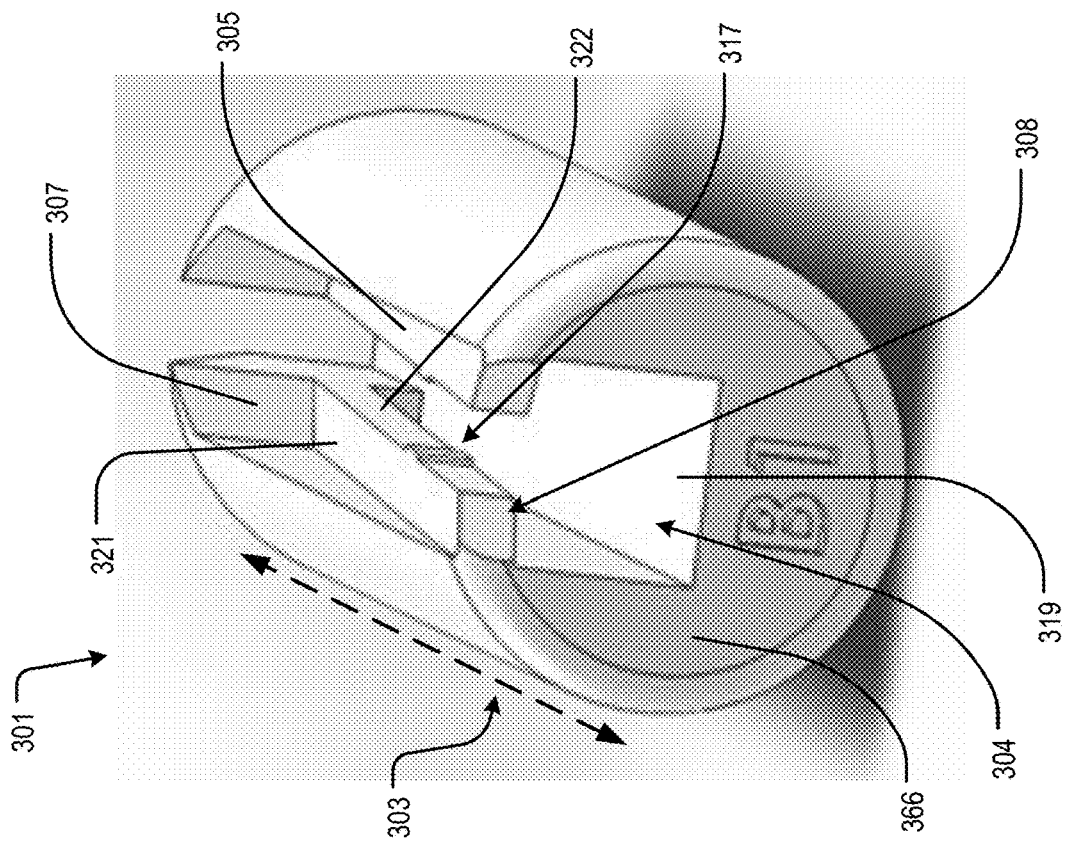
FIG. 3A is an illustration of a first component of a torque tool, according to an exemplary embodiment of the present disclosure.

FIG. 3A and FIG. 3B provide perspective views of a bottom component 301 of a torque tool. The bottom component 301 includes a working channel 304 having a working axis 303. The working axis 303, in an example, is parallel to a surface 319 of the working channel 304. The bottom component 301 further includes one or more opposing fingers 308. The one or more opposing fingers 308 can define a sliding track 305. Moreover, the sliding track 305 can be sloped from one end of the bottom component 301 to the other. In an embodiment, the sliding component 305 can have a decline from an aft end 366 of the bottom component 301 to a fore end of the bottom component 301. For example, a fore end of the sliding track 305 can be positioned a pre-determined distance away from the surface 319 of the working channel 304 and an aft end of the sliding track 305 can be positioned a pre-determined distance relative thereto, the length of the sliding track 305 therebetween having a linear slope. The difference between these distances can be referred to as the 'delta'. Specifically, the fore end of the sliding track 305 can be, for example, 2 mm lower than the aft end of the sliding track 305, allowing a pathway for gradual tightness and securing of a catheter therein. This delta can be selected based upon application requirements, including a desired universality of the torque tool, for instance. To this end, the distance from the surface 319 of the working channel 304 to the fore end of the sliding track 316 can be pre-determined according to a size of catheter to be used. For instance, the catheter to be used can be a 3 Fr, and the distance of the fore end of the sliding track 305 to the surface 319 of the working channel 304 can be sized such that, during operation, a top component slides down the sliding track 305 and comes into contact with a stop surface 307 of the bottom component 301 while concurrently applying sufficient pressure to the 3 Fr catheter to control it. In an embodiment, the delta between the fore end of the sliding track 305 and the aft end of the sliding track 305 can allow for catheters of varying sizes to be employed. This is possible because, as a top component, to be described later, slides along the sliding track 305 from the aft end 366 to the fore end, increasing pressure is applied to a catheter within the working channel such that, when sufficient pressure is applied, sliding of the top component can be stopped.

According to an embodiment, the above-described delta of the sliding track 305 facilitates identification of the aft end 366 of the torque tool and the fore end of the torque tool, as the fore end of the sliding track is positioned more proximate the surface 319 of the working channel 304. Moreover, as the torque tool is only effective when this smallest portion of the sliding track 305 is in the fore, the sliding track 305 aids in ensuring that the torque tool is appropriately positioned on the catheter.

According to an embodiment, the bottom component 301 of the torque tool can be made of a material including, among others, plastic and metal, the material being, in an example, a biocompatible and/or sterilizable material.

According to an embodiment, each finger 308 of the sliding track 305 has a top surface 321, a side surface 322, and a bottom surface. In an example, a protrusion 317 is disposed on the side surface 322 of the finger 308. The protrusion 317 on the side surface 322 can be any shape such that, in order to overcome and move the top component beyond the protrusion 317, additional force in excess of what might be adequate for normal operation is required. This protrusion 317 can be, for instance, a backstop following securing of the catheter within the working channel 304.

According to an embodiment, the top surface 321 may comprise track gradations, or features disposed at intervals along the top surface 321 to control the position of the top component. For example, the track gradations (not shown) can be projections or depressions such that, similar to the protrusion 317 of the side surface of the sliding track, a force in excess of a normal sliding force is required to move the top component. For instance, the track gradations can be referred to as tiles, wherein each tile moves the top component a predefined length down the sliding track, allowing for controlled pressure application to a catheter thereunder.

According to an embodiment, and as shown in FIG. 3B, the surface 319 of the working channel 304 can be covered with a tactile material 314 for improved contact and control of a catheter within the working channel 304. In an example, the tactile material 314 can be rubber, among others, with a thickness that can be, for instance, 1 mm. It can be appreciated that the tactile material 314 and the thickness, thereof, can be defined in accordance with a specific application having specific dimensional requirements, and as such, the above exemplary specifications should be considered non-limiting.

Figure 3D:
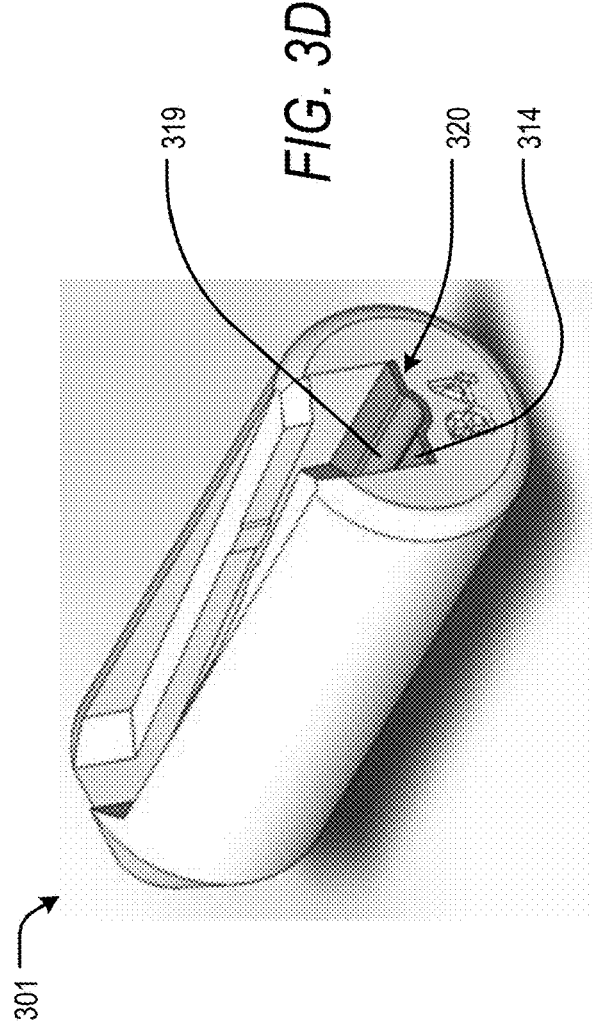
FIG. 3D is an illustration of a first component of a torque tool, according to an exemplary embodiment of the present disclosure.
Figure 3E:
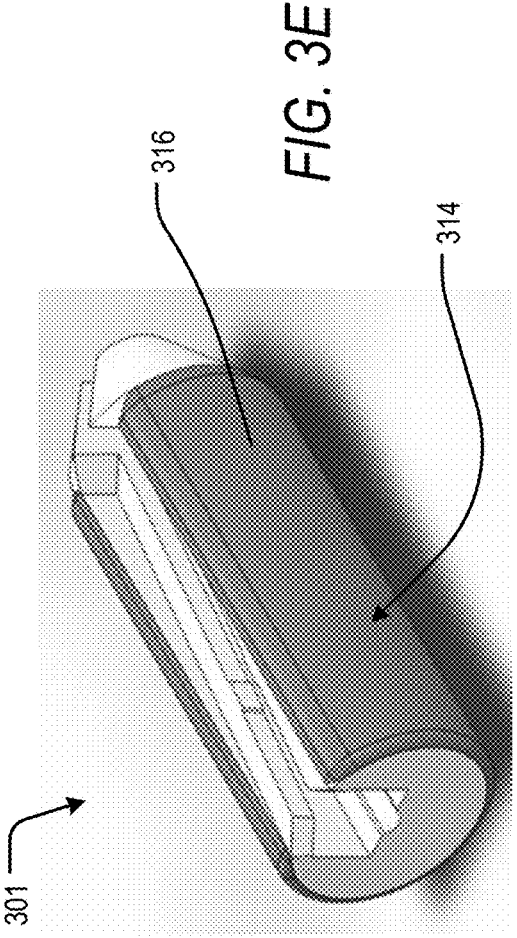
FIG. 3E is an illustration of a first component of a torque tool, according to an exemplary embodiment of the present disclosure.
Figure 3C:
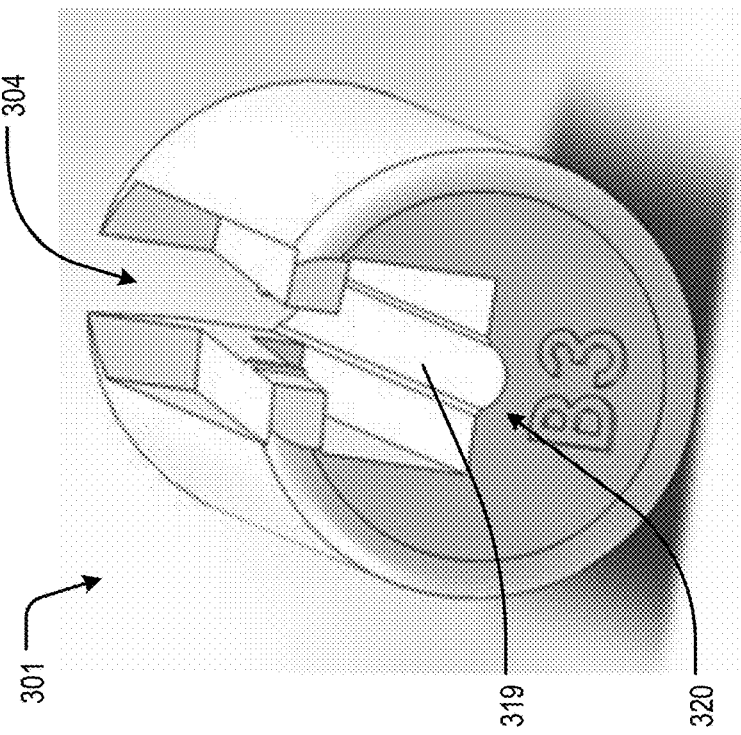
FIG. 3C is an illustration of a first component of a torque tool, according to an exemplary embodiment of the present disclosure.

FIG. 3C to the FIG. 3E provide illustrations of modifications to the above-described bottom component of the torque tool.

With reference to FIG. 3C, a bottom component 301 can have a surface 319 of a working channel 304, said surface 319 defining a working channel feature 320. In an embodiment, the working channel feature 320 is a depression within the bottom component 301 for increased contact area between the bottom component 301 and a catheter placed therein.

With reference to FIG. 3D, the bottom component 301 of FIG. 3C, having the working channel feature 320, can be supplemented with a layer of a tactile material 314 disposed on the surface 319 of the working channel. In an example, the tactile material 314 can be rubber, among others, with a thickness that can be, for instance, 1 mm. It can be appreciated that the tactile material 314 and the thickness, thereof, can be defined in accordance with a specific application having specific dimensional requirements, and as such, the above exemplary specifications should be considered non-limiting.

With reference to FIG. 3E, the bottom component 301 can have a layer of tactile material covering an external surface thereof. In an example, the external surface of the bottom component 301 can be covered with a tactile material 314, the tactile material 314 thereby defining a tactile digital surface 316. In creating the tactile digital surface 316 of the bottom component 301, user interaction with the torque tool can be enhanced through improved control and handling. In an example, the tactile material 314 can be rubber, among others, with a thickness that can be, for instance, 1 mm. It can be appreciated that the tactile material 314 and the thickness, thereof, can be defined in accordance with a specific application having specific dimensional requirements, and as such, the above exemplary specifications should be considered non-limiting.

During operation of the torque tool, a top component can be slid along the sliding track of the bottom component until a catheter therebetween is secured into place. In order to more easily adjust the torque tool, corresponding sliding features are included within the top component, described with reference to FIG. 4A to FIG. 4D.

According to an embodiment, and as illustrated in FIG. 4A, a top component 402 of a torque tool, referred to as a sled 406, comprising one or more slots 409 for slidable engagement with the sliding track of the bottom component of the torque tool. It can be appreciated that the one or more slots 409 of the sled 406 have corresponding features to the sliding track of the bottom component. In particular, the delta of the sliding track of the bottom component has a corresponding delta of the one or more slots 409 of the sled 406. A bottom end of the sled 406 can be defined by a catheter engaging surface 413. The catheter engaging surface 413 can be, for example, a flat surface or can be contoured with respect to a specific shape and size of catheter being used. A top end of the sled 406 can include a tactile feature 415 substantially similar to the tactile feature 215 of FIG. 2J. The tactile feature 415 allows for improved user control of the sled 406 relative to the sliding track of the bottom component of the torque tool. In an example, the tactile feature 415 is a projection, as shown in FIG. 4A. Further, as shown in FIG. 4B, the tactile feature 415 can include, for instance, a series of alternating ribs 469 for improved tactile feedback. According to an embodiment, the sled 406 can be further outfitted with a tactile tab 418 for improved user control in reversibly sliding the sled 406 in a forward and rearward direction. In an example, the tactile tab 418 can be a projection normal to a working axis of the torque tool (see 303 of FIG. 3A). In addition, the tactile tab 418 can be positioned at any position along the length of the top component 402 or can, for example, be disposed at a forward end of the top component 402.

According to an embodiment, a length of the sled 406, from an aft end 466 to a fore end 467 (shown in FIG. 4D), can be pre-determined according to, for example, a length from the stop surface to the protrusion of the sliding track of the bottom component. In an example, the length of the sled 406 can be pre-determined such that maximum contact area is achieved between the catheter engaging surface of the top component 402 and the catheter. Moreover, the length of the sled 406 can be pre-determined according to the length of the bottom component of the torque tool.

FIG. 4B provides an illustration of the sled 406 of the torque tool, wherein the catheter engaging surface 413 is covered by a layer of a tactile material 414. In an example, the tactile material 414 can be rubber, among others, with a thickness that can be, for instance, 1 mm. It can be appreciated that the tactile material 414 and the thickness, thereof, can be defined in accordance with a specific application having specific dimensional requirements, and as such, the above exemplary specifications should be considered non-limiting.

FIG. 4C provides an illustration of the sled 406 of the torque tool, wherein the catheter engaging surface 413 defines, in part, a catheter engaging aspect 412 of the sled 406. As described with respect to the working channel feature of the bottom component of the torque tool, the catheter engaging aspect 412 of the sled 406 (i.e. top component) can be a depression within the body of the sled 406. The depression can be dimensioned according to an application and can be sized according to the working channel feature of the bottom component in order to maximize contact area between the torque tool and the surface of the catheter.

A combination of FIG. 4B and FIG. 4C, FIG. 4D provides an illustration of a sled 406 of the torque tool, wherein the bottom end of the sled 406 is defined by a catheter engaging surface 413 covered by a layer of tactile material 414, the catheter engaging surface 413 defining, in part, a catheter engaging aspect 412 of the sled 406. As in FIG. 4C, the catheter engaging aspect 412 can be a depression within the body of the sled 406. The depression can be dimensioned according to an application and can be sized according to the working channel feature of the bottom component in order to maximize contact area between the torque tool and the surface of the catheter.

The working channel feature and catheter engaging aspect of the bottom component and top component described, respectively, above, can be aligned in order to facilitate both sliding of a catheter and securing thereof.

Figure 5C:
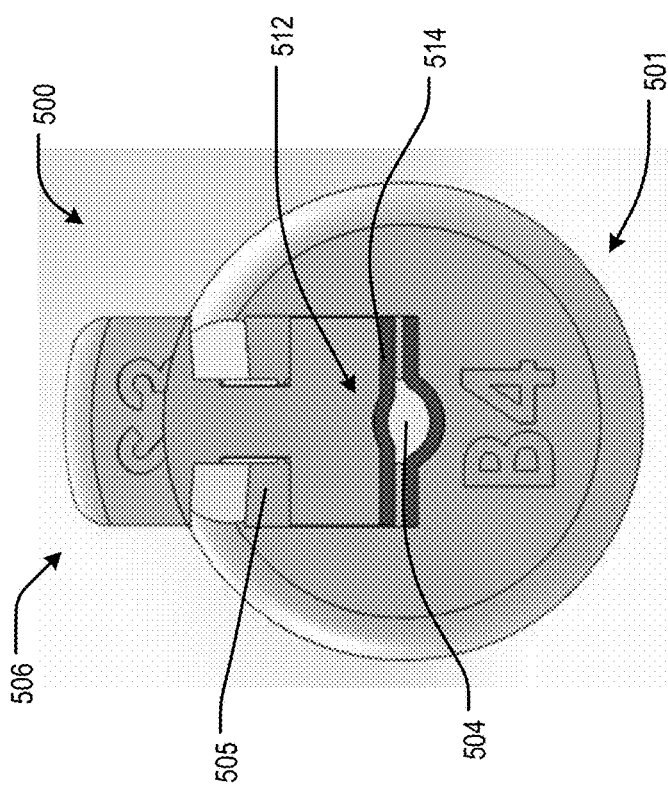
FIG. 5C is an illustration of a torque tool, according to an exemplary embodiment of the present disclosure.
Figure 5A:
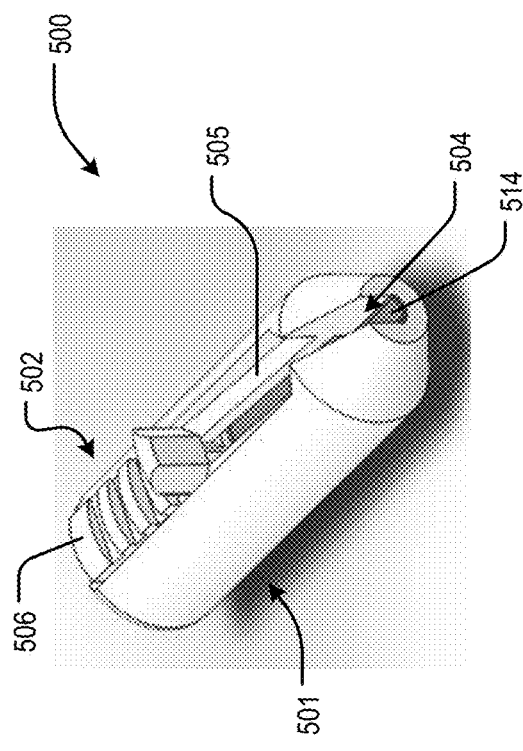
FIG. 5A is an illustration of a torque tool, according to an exemplary embodiment of the present disclosure.
Figure 5B:
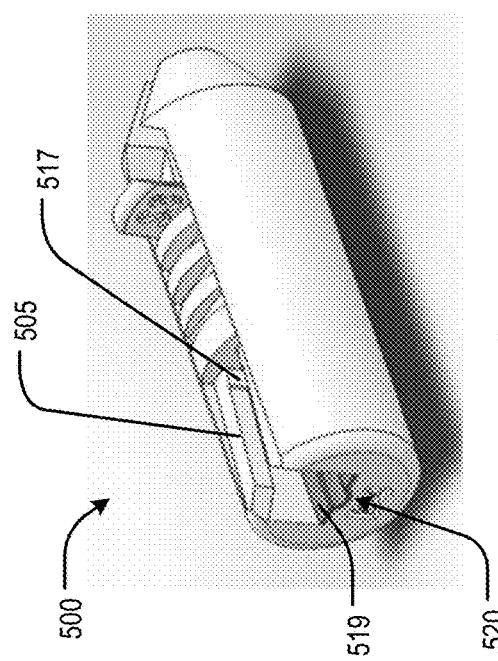
FIG. 5B is an illustration of a torque tool, according to an exemplary embodiment of the present disclosure.

According to an embodiment, FIG. 5A, FIG. 5B, and FIG. 5C provide illustrations of a torque tool of the present disclosure. FIG. 5A and FIG. 5B, for example, demonstrate two positions of a top component of the torque tool relative to a bottom component of the torque tool. As shown in FIG. 5A, a top component 502, or sled 506, of a torque tool 500 is in an aft position within a sliding track 505 of a bottom component 501 of the torque tool 500. The bottom component 501 includes a working channel 504 and a tactile material 514 disposed on a surface of the working channel 504 for engagement with a catheter. As the sled 506 is moved from the aft position to a fore position, as shown in FIG. 5B, the sled 506 overcomes a protrusion 517 on a side surface of the sliding track 505. It can be observed from FIG. 5B that the surface 519 of the working channel defines, in part, a working channel feature 520 of the bottom component.

With the sled 506 in the fore position along the sliding track 505, as shown in FIG. 5C, the working channel 504 can have a diameter pre-determined for a catheter to be used. In an example, according to the size of the catheter, the fore position of the sled 506 can be in contact with a stop surface of the bottom component 501 or the fore position of the sled 506 can be immediately distal of the protrusion of the sliding track 505. To improve surface contact with the catheter, a catheter engaging surface of the sled 506 can define, in part, a catheter engaging aspect 512 of the sled 506. The catheter engaging surface of the sled 506 can be covered with a tactile material 514 for enhanced control of the catheter. In an example, the tactile material 514 can be rubber, among others, with a thickness that can be, for instance, 1 mm. It can be appreciated that the tactile material 514 and the thickness, thereof, can be defined in accordance with a specific application having specific dimensional requirements, and as such, the above exemplary specifications should be considered non-limiting.

With reference again to FIG. 5B, according to an embodiment, when the sled 506 is pushed rearward from the fore position, circumferential pressure applied to the catheter can be relieved such that the catheter may move within the working channel of the torque tool 500.

Figure 5D:
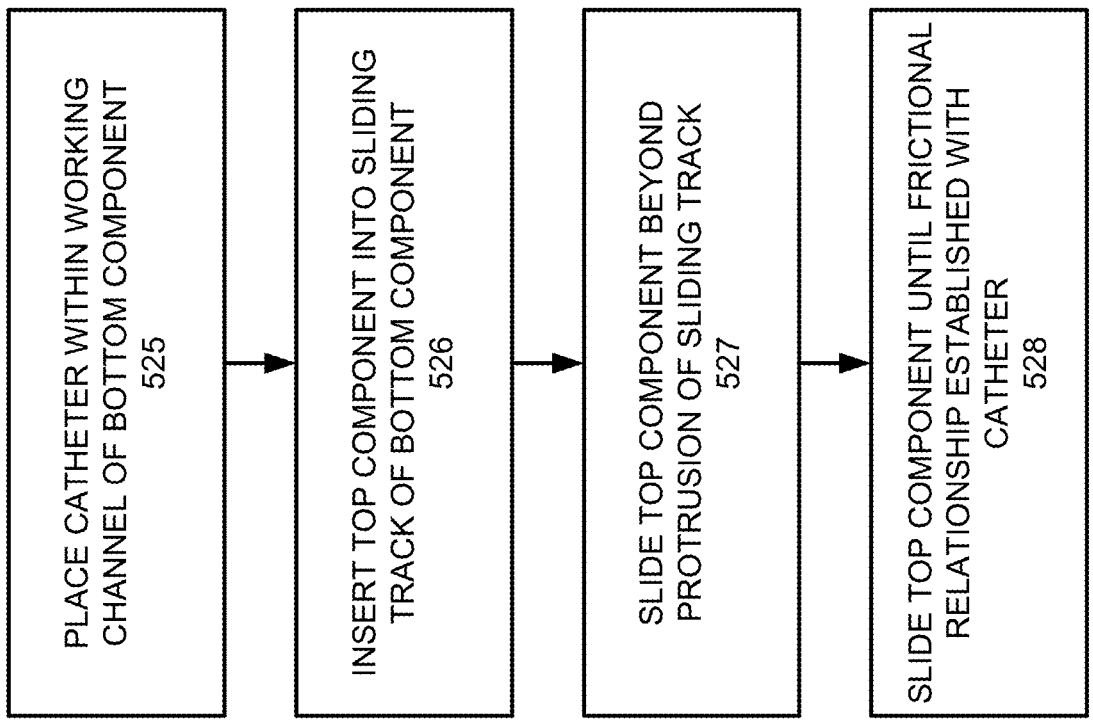
FIG. 5D is a flowchart of an implementation of a torque tool, according to an exemplary embodiment of the present disclosure.

FIG. 5D describes a process of implementing the torque tool described above with reference to FIG. 5A to FIG. 5C.

At step 525, the top component, or sled, is removed from the torque tool and a catheter is placed within the working channel of the bottom component. The torque tool, having known dimensions therein, in an example, can be selected according to the dimensions of a catheter.

At step 526, the sled is returned and is positioned at an aft position along the sliding track of the bottom component.

At step 527, the sled is slid down the sliding track of the bottom component, gradation by gradation, until the protrusion of the sliding track is surpassed. When sufficient pressure is applied to the catheter, at step 528, the sled is in a fore position and the torque tool is ready for operation.

In the same way that the sled was moved down the sliding track of the bottom component, when an operation is complete, the sled may be pushed toward the aft position again, allowing the catheter to freely move within the working channel of the bottom component.

Figure 6A:
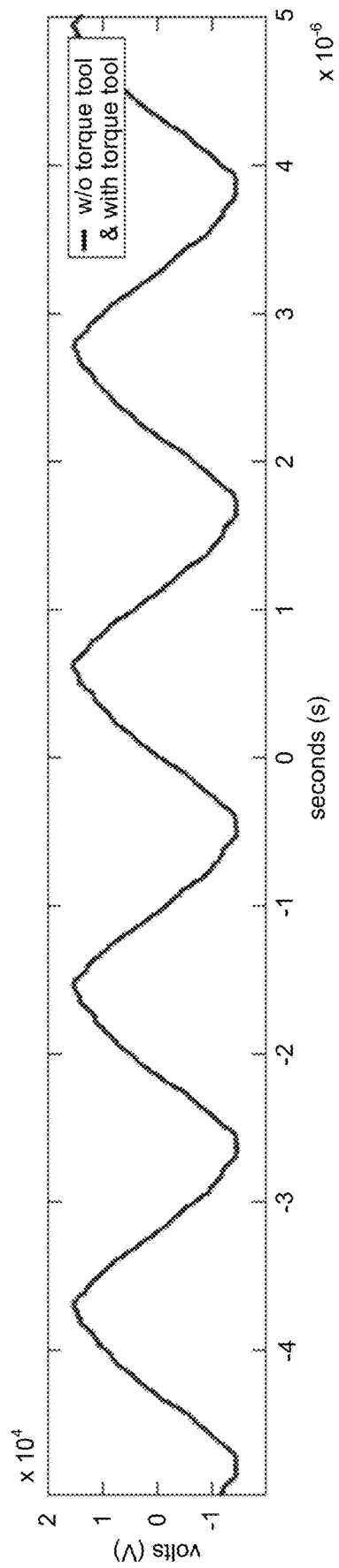
FIG. 6A is a graphical representation of the impact of a torque tool on the efficacy of ablation, according to an exemplary embodiment of the present disclosure.
Figure 6B:
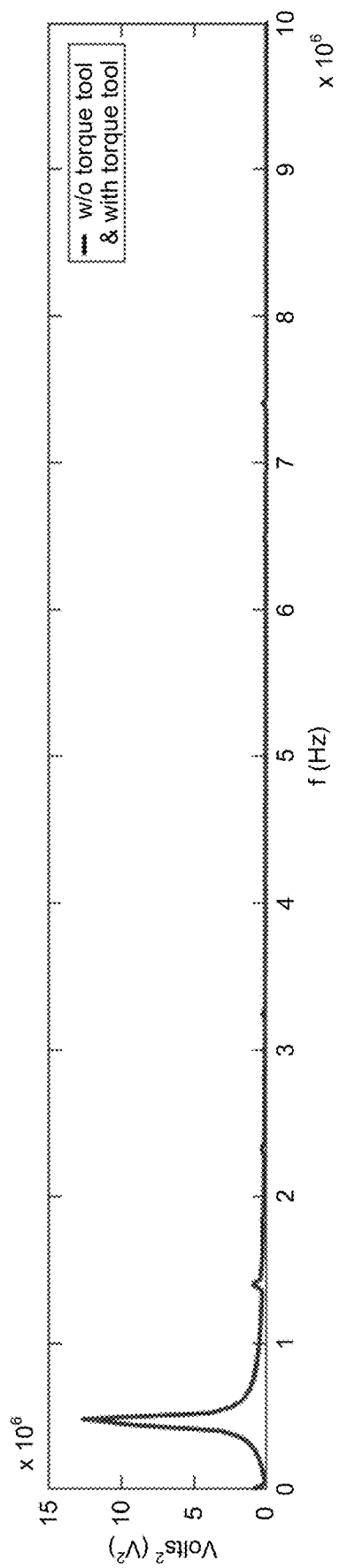
FIG. 6B is a graphical representation of the impact of a torque tool on the efficacy of ablation, according to an exemplary embodiment of the present disclosure.
Figure 6C:
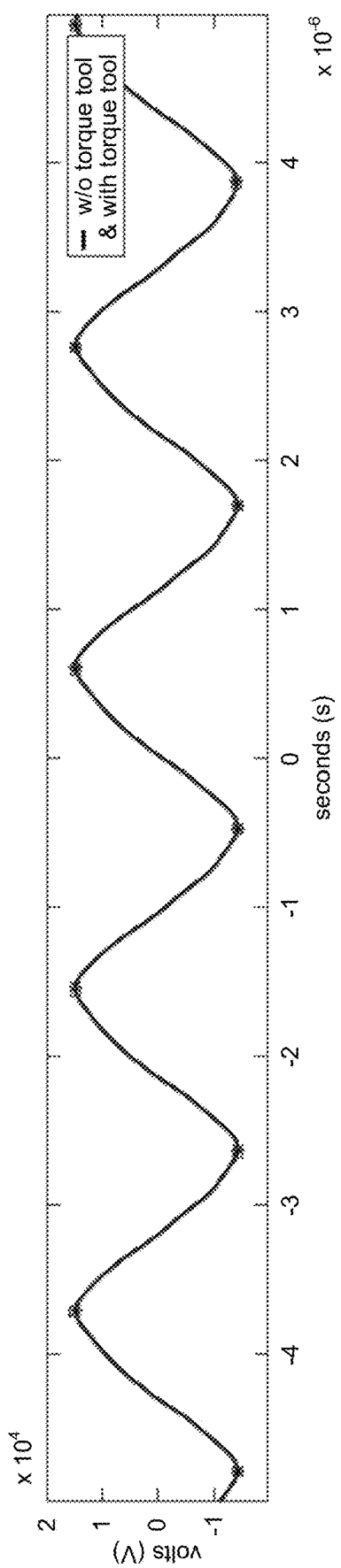
FIG. 6C is a graphical representation of the impact of a torque tool on the efficacy of ablation, according to an exemplary embodiment of the present disclosure.

FIG. 6A to FIG. 6C provide non-limiting experimental information regarding application of the torque tool of FIG. 5A to FIG. 5C. In the graphical representations, function of an ablation catheter is described. These representations demonstrate that, contrary to current approaches that may apply excessive force to soft, cylindrical catheters such as those used for transcatheter ablations, thereby rendering them dysfunctional, the torque tool of the present disclosure allows for normal function of soft, cylindrical catheters while providing control thereof. FIG. 6A, FIG. 6B, and FIG. 6C demonstrate that applied voltages, as a function of a time and frequency, are consistent with and without the torque tool applied, indicating that the circumferential pressure applied to the catheter after engaging the torque tool does not impact function of the catheter.

The above-described torque tool can be modified for specific implementations. For example, the method of securing a catheter within a working channel of the torque tool can be one of a variety of methods for doing so.

For example, in an embodiment, a set screw may be used in order to secure the catheter within the torque tool. With reference to FIG. 7A, a front view of a torque tool 700, the torque tool 700 may include a hollow body 731 having a slit 730 through which a catheter can pass. The torque tool 700 further comprises at least one set screw 732 passing through a wall of the hollow body 731. During use, the at least one set screw 732 can be screwed varying depths within the hollow body 731 in order to contact and secure the catheter therein. FIG. 7B provides a perspective view of the torque tool 700 of FIG. 7A, the torque tool 700 having a hollow body 731 and at least one set screw 732. In an embodiment, the hollow body 731 may be substantially cylindrical, as shown in FIG. 7C, a side view of the torque tool 700. A catheter 710, passed through the slit of the hollow body 731, can be contacted by the at least one set screw 732 of the torque tool, thereby securing the catheter 710 in position and preventing slippage. As shown in FIG. 7C, the at least one set screw 732 can be one set screw 732 positioned in a central location of the hollow body 731. In an embodiment, the at least one set screw 732 can be a thumbscrew. The thumbscrew can be easily tightened and or loosened by hand in order to allow repositioning of the catheter 710 within the hollow body 731, if necessary. According to an embodiment, the hollow body 731 of the torque tool 700 may be fabricated from a material including, among others, plastic and metal, said material being, for instance, biocompatible and/or sterilizable.

Figure 7D:
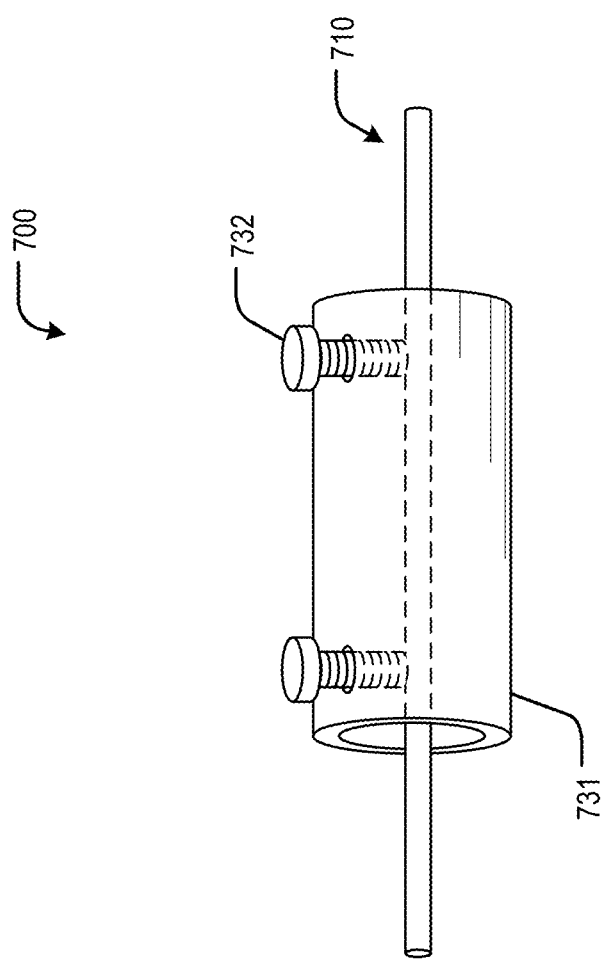
FIG. 7D is a schematic of a perspective view of a torque tool, according to an exemplary embodiment of the present disclosure.

According to an embodiment, rather than having a single set screw centrally located on the hollow body of the torque tool, there can be two or more set screws positioned, at least, at each end of the hollow body, as shown in FIG. 7D. With reference to FIG. 7D, a torque tool 700 is described, the torque tool 700 having a hollow body 731, and two set screws 732 positioned at each end of the hollow tube 731. By increasing the number of set screws for securing a catheter 710 within the hollow body 731, the contact area therebetween, and therefore security thereof, can be increased, accordingly.

Figure 7F:
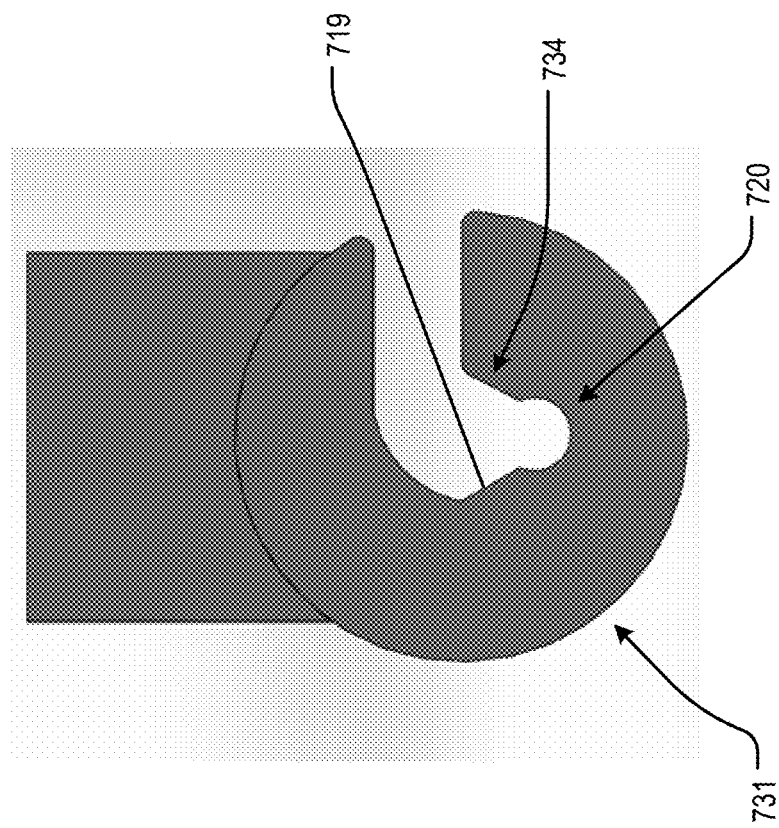
FIG. 7F is an illustration of a view of a torque tool, according to an exemplary embodiment of the present disclosure.
Figure 7E:
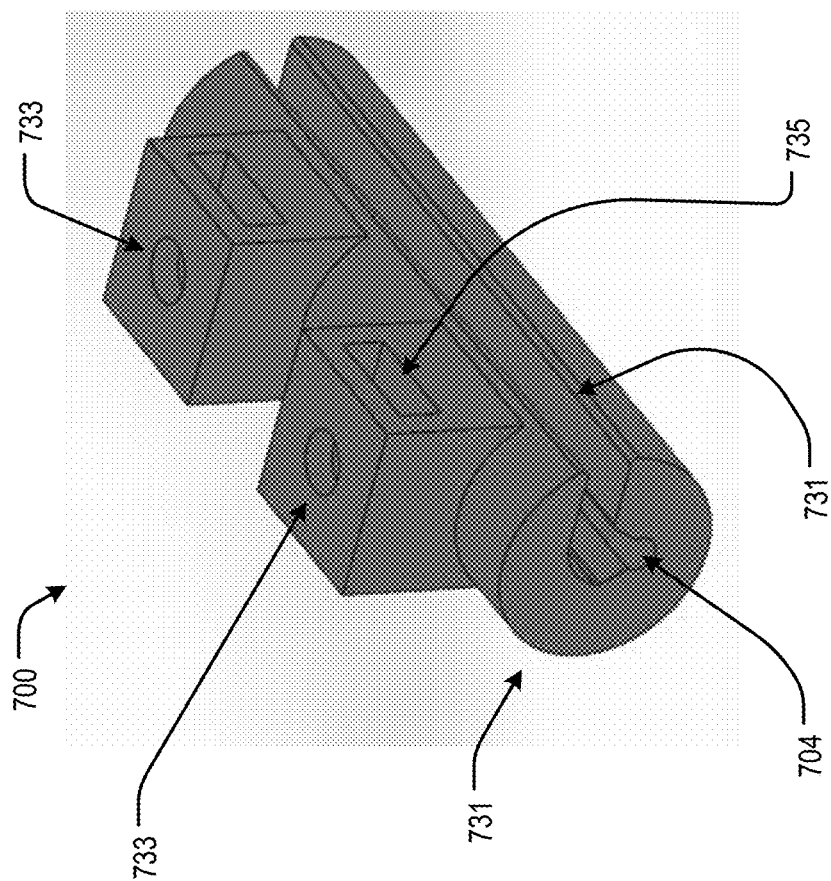
FIG. 7E is an illustration of a perspective view of a torque tool, according to an exemplary embodiment of the present disclosure.

FIG. 7E and FIG. 7F, a modification of FIG. 7A to FIG. 7D, describe an embodiment of a torque tool 700 including a hollow body 731 having a slit 731 for passing a catheter therethrough and into a working channel 704 of the hollow body 731. The torque tool 700 further comprises at least one pocket 735 created in an upper end of the hollow body 731, the at least one pocket 735 being sized to house a nut corresponding to an at least one set screw inserted through a corresponding set screw aperture 733. Each of the at least one pocket 735 is sized according to the at least one set screw therein to prevent slipping of a corresponding nut from the torque tool. During operation, each of the at least one set screw can be engaged, lower a bottom surface of the at least one set screw until contact is made with the catheter within the working channel 704 of the hollow body 731. At such time, additional ones of the at least one set screw can be engaged within a corresponding set screw aperture 733 and the catheter can be fully secured.

According to an embodiment, and with reference to FIG. 7F, the working channel of the hollow body 731 of the torque tool can be modified, as described earlier, to have a working channel feature 720 to improve surface contact area between the torque tool and the catheter. Additionally, a surface 719 of the working channel can define, in part, a working channel guiding feature 734. In an example, the working channel guiding feature 734 can be a funnel feature that directs the catheter from the slit of the hollow body and into contact with the working channel feature 720 of the working channel.

Figure 8A:
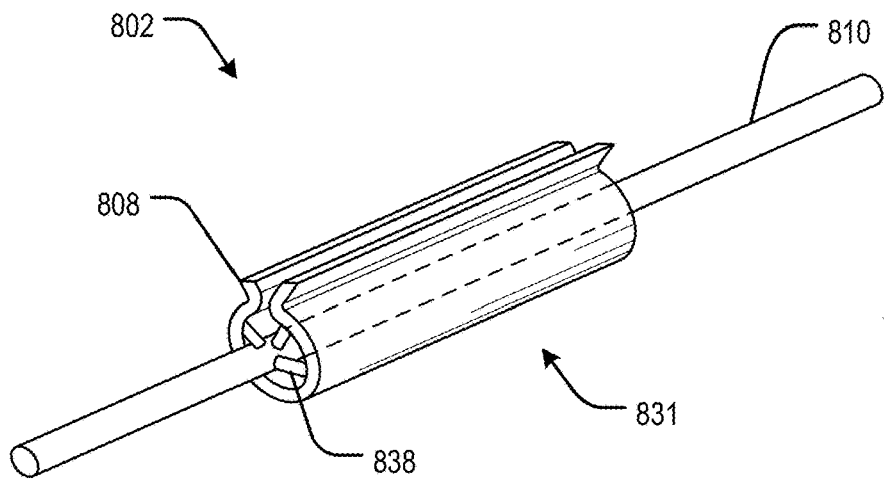
FIG. 8A is a schematic of a first component of a torque tool, according to an exemplary embodiment of the present disclosure.
Figure 8B:
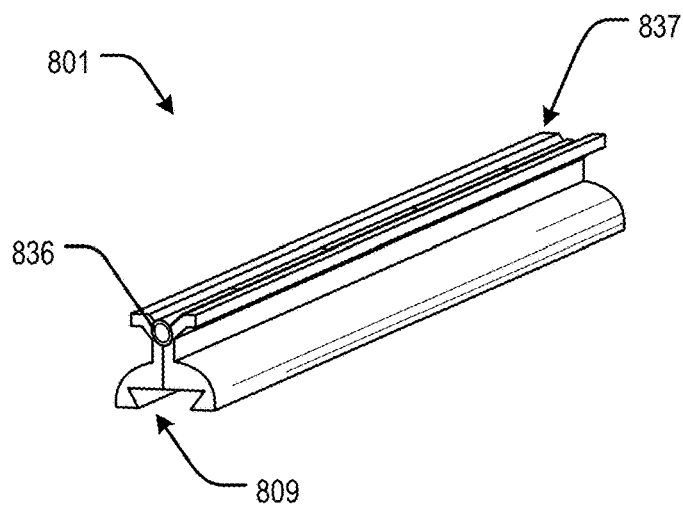
FIG. 8B is a schematic of a second component of a torque tool, according to an exemplary embodiment of the present disclosure.
Figure 8C:
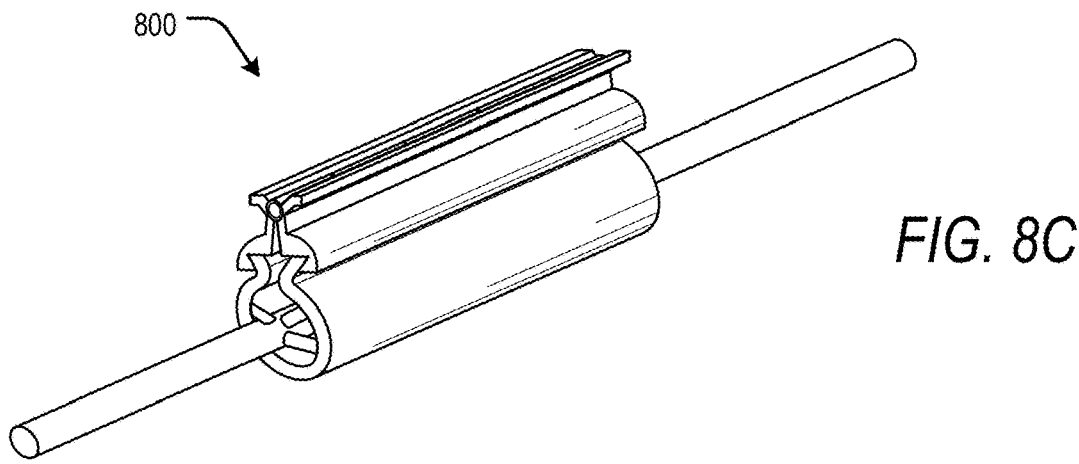
FIG. 8C is a schematic of a torque tool, according to an exemplary embodiment of the present disclosure.

According to an embodiment, a torque tool of the present disclosure may comprise a bottom component and a top component relying on a hinge for securing a catheter therein. With reference to FIG. 8A to FIG. 8C, a torque tool 800 can comprise of a bottom component 802 and a top component 801. In an embodiment, the bottom component 802 can have an opening at an upper end and can be defined by one or more pillars 838 extending inwardly from a hollow body 831. In an example, the one or more pillars 838 are polymer pillars for providing frictional contact with a catheter 810 placed within the bottom component 802. To this end, the catheter 810 can be positioned proximate the one or more pillars 838. At the upper end of the bottom component 802, near the opening, one or more opposing fingers 808 are disposed. In order to bring the one or more opposing fingers 808 into proximity and provide securing contact between the one or more pillars 838 and a catheter 810, a top component 801 includes a corresponding one or more slots 809 and a fastening mechanism includes a squeezing feature 837 and a spring 836. During use, the catheter 810 can be passed into the bottom component 802 through the opening formed at the upper end of the bottom component 802. The top component 801, or clip 801, can be manipulated via the squeezing feature 837 to engage the corresponding one or more slots 809 with the one or more fingers 808, thereby bringing the one or more pillars 838 into securing contact with the catheter 810. In order to reposition the torque tool 800, the squeezing feature 8387 can be engaged, thereby releasing the bottom component 801 and allowing for movement of the catheter 810. FIG. 8C provides an illustration of an implementation of the torque tool 800.

According to an embodiment, the dimensions and arrangement of each of the one or more pillars 838 can be determined in accordance with a dimension of a catheter to be secured. Accordingly, the spring 836 of the top component 837 can be selected in order to provide an appropriate fastening force to the bottom component 802, cautious not to apply excessive force to the catheter therein. In an example, the one or more pillars 838 extend the entire length of the bottom component 802 of the torque tool 800.

Figure 9A:
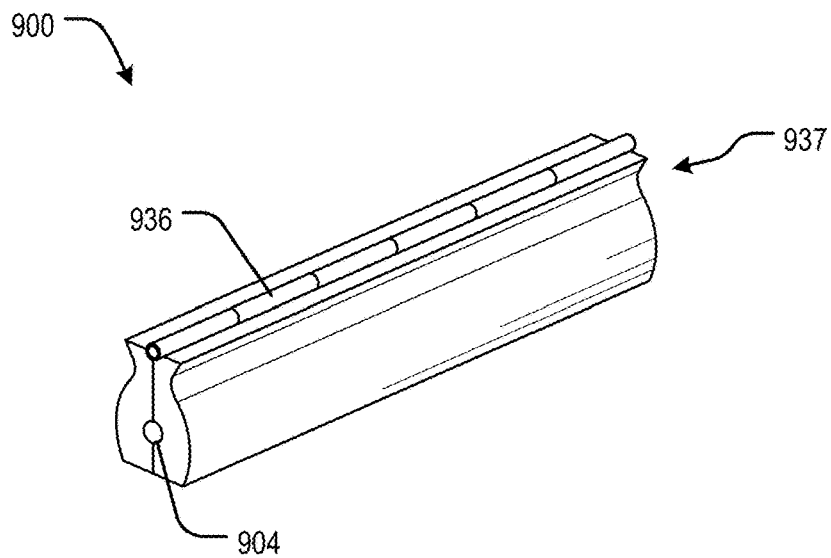
FIG. 9A is a schematic of a torque tool, according to an exemplary embodiment of the present disclosure.
Figure 9B:
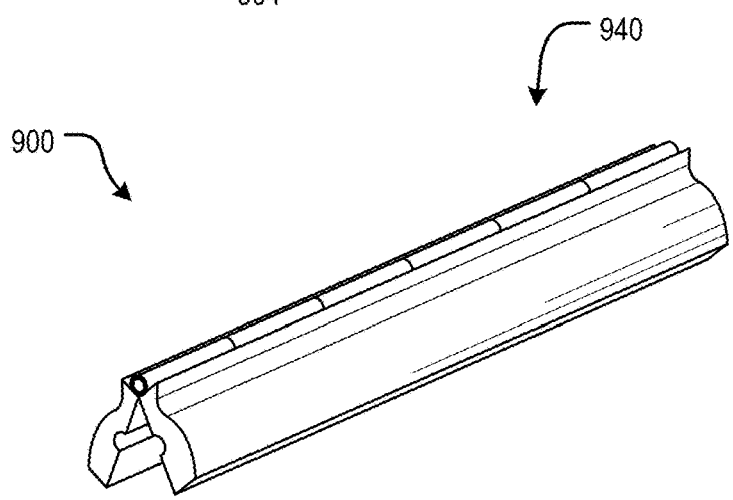
FIG. 9B is a schematic of a torque tool in an open position, according to an exemplary embodiment of the present disclosure.
Figure 9C:
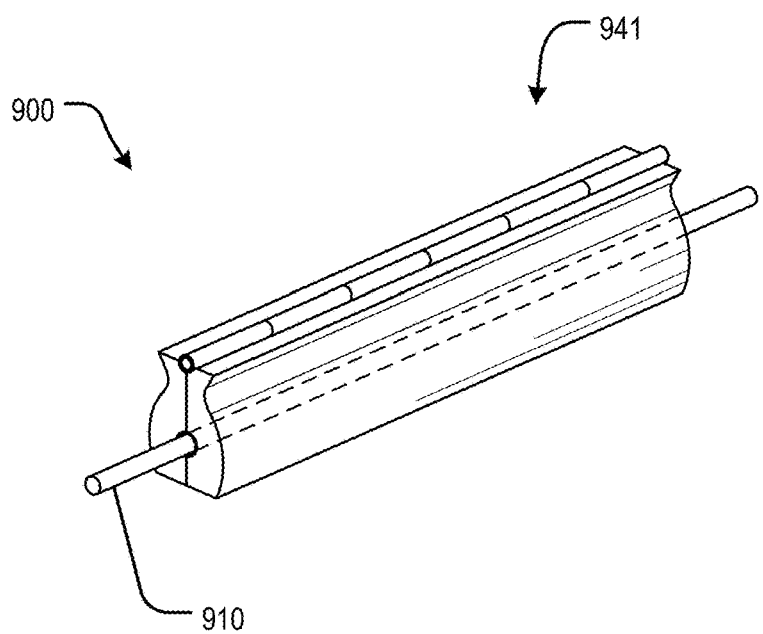
FIG. 9C is a schematic of a torque tool in a closed position, according to an exemplary embodiment of the present disclosure.

FIG. 9A to FIG. 9C provide illustrations of an all-in-one torque tool, according to an embodiment of the present disclosure. As shown in FIG. 9A, a torque tool 900 includes a squeezing feature 937, the squeezing feature 937 relying on a spring mechanism 936 for fastening a catheter therein. To this end, the torque tool 900 can include a working channel 904 sized according to a catheter to be used. In an example, the working channel 904 can be lined with a tactile material, such as silicone or other elastomer, in order to improve frictional contact between the torque tool 900 and the catheter. Additionally, the elastomeric tactile material provides a soft casing for the catheter to decrease the possibility of electrical current impedance that could be caused by the force that is used to keep the device in place.

As shown in FIG. 9B, pinching the squeezing feature 937 at an upper end of the torque tool 900 positions the torque tool 900 in an open position 940, the catheter then being able to placed therein.

According to an embodiment, as shown in FIG. 9C, once the desired location for the product is located, the squeezing feature 937 may be released and the torque tool 900 may secure a catheter 910 within the working channel in a closed position 941. As described with respect to FIG. 8C, the spring 936 of the torque tool 900 can be selected in order to provide an appropriate fastening force to the catheter 910, cautious not to apply excessive force.

In an embodiment, if repositioning of the torque tool 900 is required, the squeezing mechanism 937 can be manipulated in order to release the catheter 910 such that it can be moved.

Figure 10C:
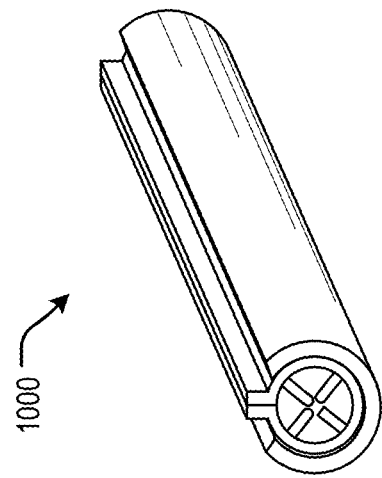
FIG. 10C is a schematic of a torque tool, according to an exemplary embodiment of the present disclosure.
Figure 10B:
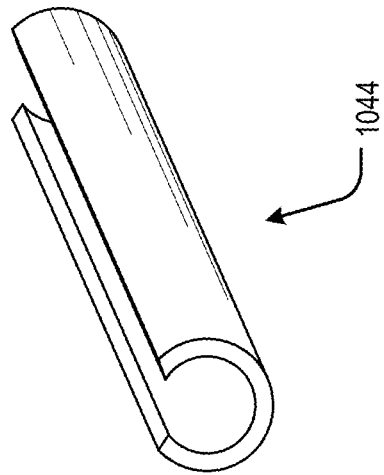
FIG. 10B is a schematic of a second component of a torque tool, according to an exemplary embodiment of the present disclosure.
Figure 10A:
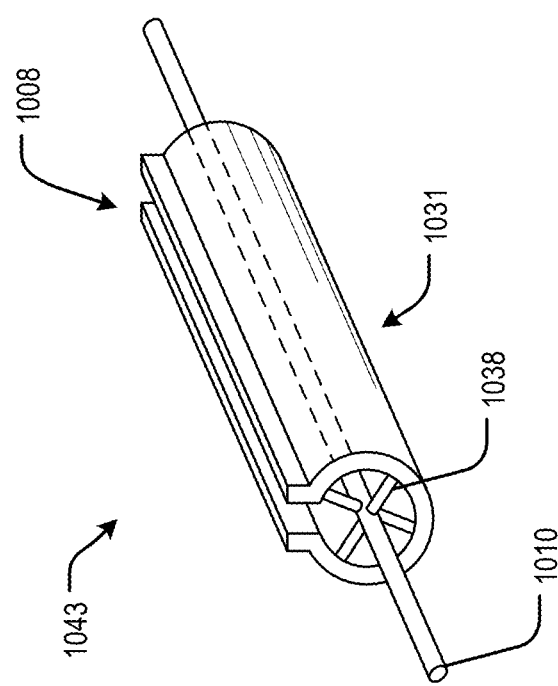
FIG. 10A is a schematic of a first component of a torque tool, according to an exemplary embodiment of the present disclosure.

According to an embodiment, FIG. 10A to FIG. 10C provide illustrations of a modification of the torque tool of FIG. 8A to FIG. 8C. With reference to FIG. 10A to FIG. 10C, a torque tool 1000 can comprise of an inner component 1043 and an outer component 1044. In an embodiment, the inner component 1043 can have an opening at an upper end and can be defined by one or more pillars 1038 extending inwardly from a hollow body 1031. In an example, the one or more pillars 1038 are polymer pillars for providing frictional contact with a catheter 1010 placed within the inner component 1043. To this end, the catheter 1010 can be positioned proximate the one or more pillars 1038. At the upper end of the inner component 1043, near the opening, one or more opposing fingers 1008 are disposed. In order to bring the one or more opposing fingers 1008 into proximity and provide securing contact between the one or more pillars 1038 and the catheter 1010, the outer component 1044 can be applied circumferentially.

During use, the catheter 1010 can be passed into the inner component 1043 through the opening formed at the upper end of the inner component 1043. The outer component 1044, as shown in FIG. 10C, can be manipulated to apply circumferential force to the inner component 1044, thereby bringing the one or more fingers 1008 into close proximity, and subsequently bringing the one or more pillars 1038 into securing contact with the catheter 1010. In order to reposition the torque tool 1000, the outer component 1044 can be disengaged from the inner component 1043, thereby allowing for movement of the catheter 1010 therein. FIG. 10C provides an illustration of an implementation of the torque tool 1000.

According to an embodiment, the dimensions and arrangement of each of the one or more pillars 1038 can be determined in accordance with a dimension of a catheter to be secured. Accordingly, the dimensions and materials of the outer component 1044 can be selected in order to provide an appropriate fastening force to the inner component 1043, cautious not to apply excessive force to the catheter therein. In an example, the one or more pillars 1038 extend the entire length of the inner component 1043 of the torque tool 1000. In an example, the one or more pillars 1038 are positioned only at opposite ends of the length of the inner component 1043 of the torque tool 1000.

Figure 11A:
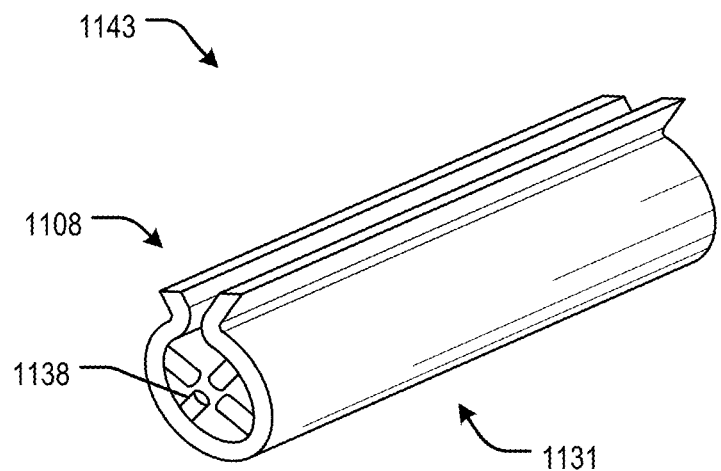
FIG. 11A is a schematic of a first component of a torque tool, according to an exemplary embodiment of the present disclosure.
Figure 11B:
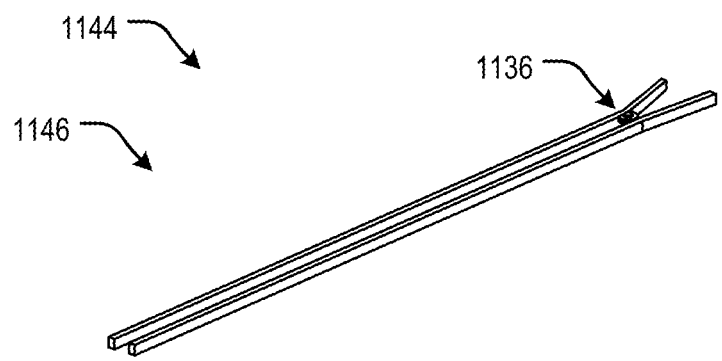
FIG. 11B is a schematic of a second component of a torque tool, according to an exemplary embodiment of the present disclosure.
Figure 11C:
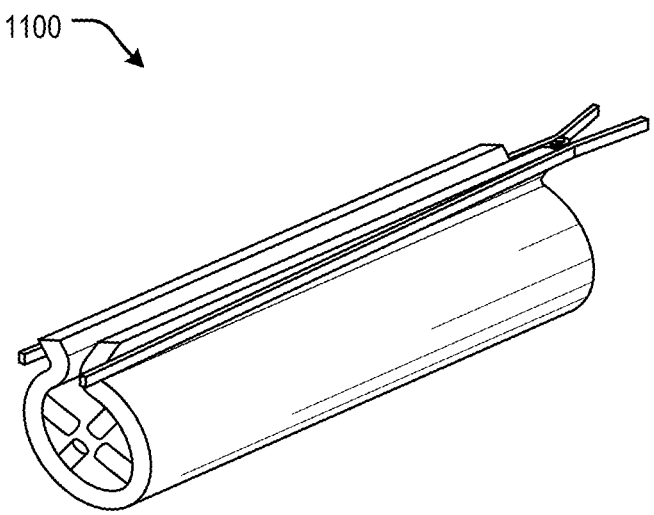
FIG. 11C is a schematic of a torque tool, according to an exemplary embodiment of the present disclosure.

In view of FIG. 10A to FIG. 10C, FIG. 11A to FIG. 11C provide illustrations of a torque tool including an inner component 1143 and an outer component 1144, said outer component 1144 providing a fastening mechanism to secure a catheter within a working channel of the inner component 1143. With reference to FIG. 11A, FIG. 11B, and FIG. 11C, the torque tool 1100 can comprise of the inner component 1143 and the outer component 1144. In an embodiment, the outer component 1143 includes a spring 1136 at one end for receiving a squeezing force in order to open and close the outer component 1143, referred to herein as a clip 1146. In an embodiment, the inner component 1143 can have an opening at an upper end and can be defined by one or more pillars 1138 extending inwardly from a hollow body 1131. In an example, the one or more pillars 1138 are polymer pillars for providing frictional contact with a catheter placed within the inner component 1143. To this end, the catheter can be positioned proximate the one or more pillars 1138. At the upper end of the inner component 1143, near the opening, one or more opposing fingers 1108 are disposed. In order to bring the one or more opposing fingers 1108 into proximity and provide securing contact between the one or more pillars 1138 and the catheter, the clip 1146 can be applied to the one or more opposing fingers 1108 and along the length of the upper end of the inner component 1143.

During use, a catheter can be passed into the inner component 1143 through the opening formed at the upper end of the inner component 1143. The outer component 1144, as shown in FIG. 11C, can be manipulated to apply a closing force to the inner component 1144, thereby bringing the one or more fingers 1108 into close proximity, and subsequently bringing the one or more pillars 1138 into securing contact with the catheter (not shown). In order to reposition the torque tool 1100, the outer component 1144 can be disengaged from the inner component 1143, thereby allowing for movement of the catheter therein. FIG. 11C provides an illustration of an implementation of the torque tool 1100.

According to an embodiment, the dimensions and arrangement of each of the one or more pillars 1138 can be determined in accordance with a dimension of a catheter to be secured. Accordingly, the dimensions and materials of the outer component 1144 and, in particular, the spring 1136 can be selected in order to provide an appropriate fastening force to the inner component 1143, cautious not to apply excessive force to the catheter therein. In an example, the one or more pillars 1138 extend the entire length of the inner component 1143 of the torque tool 1000. In an example, the one or more pillars 1138 are positioned only at opposite ends of the length of the inner component 1143 of the torque tool 1100.

Figure 12:
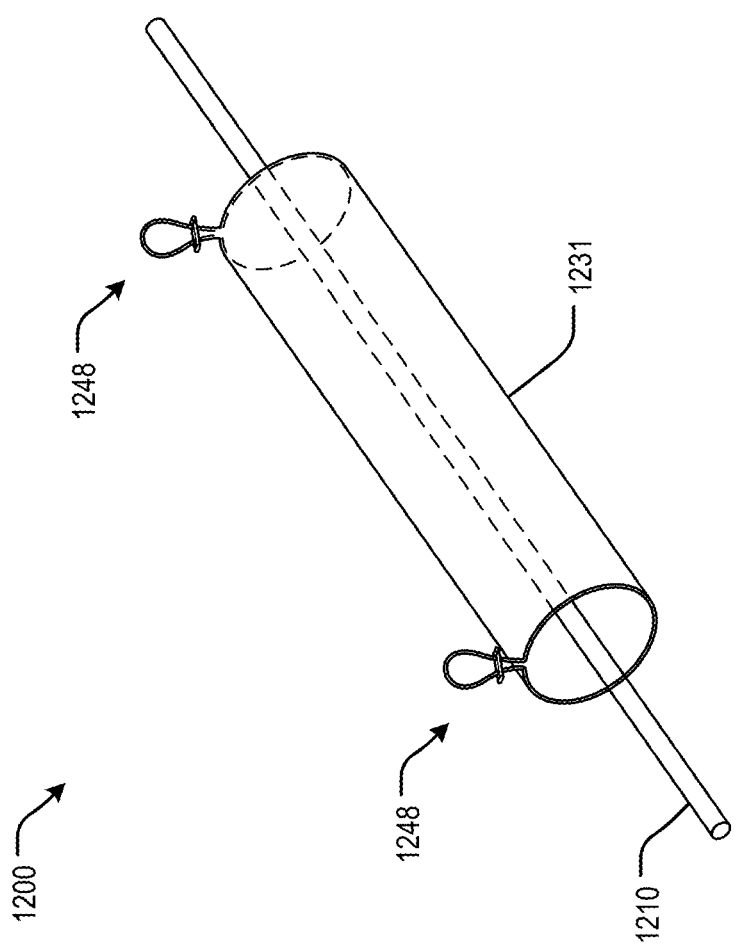
FIG. 12 is a schematic of a torque tool, according to an exemplary embodiment of the present disclosure.

According to an embodiment, FIG. 12 provides an illustration of a torque tool of the present disclosure. The torque tool 1200 includes a hollow body 1231 having at least one drawstring feature 1248 at each end of the hollow body 1231. During operation, the at least one drawstring feature 1248 can be adjusted in order to secure a catheter 1210 within a working channel of the hollow body 1231. For example, the tightness of the at least one drawstring feature 1248 can be adjusted by corresponding shoelace clamps that are fastened thereto. Moreover, the torque tool 1200 can include a corresponding at least one plastic stopper that locks the at least one drawstring feature 1248 in place upon achieving the desired tightness. In an example, having positioned the catheter 1210 within the hollow body 1231, the at least one drawstring feature 1248 may be adjusted in order to securely fasten the catheter 1210 within the torque tool 1200. When the at least one drawstring feature 1248 is fastened around the catheter 1210, the corresponding shoelace clamps may be released, thereby securing the drawstring features 1248 in position. In an embodiment, the hollow body 1231 can be fabricated from, for example, a malleable material that may be molded to the shape of the catheter. Accordingly, the malleable material can include, for instance, a silicone rubber (e.g. an elastomer) or other flexible material that is biocompatible and/or sterilizable. In an embodiment, the at least drawstring feature 1248 can be fabricated from plastic and the like.

According to an embodiment, in order to reposition the catheter 1210 within the torque tool 1200, the at least one drawstring feature 1248 can be easily loosened to allow for movement of the catheter 1210.

According to an embodiment, the at least one drawstring feature of the torque tool of FIG. 12 can be replaced with at least one C-clamp. Similarly, the C-clamp can be tightened and loosened according to the dimensions of a catheter within the hollow body.

Figure 13:
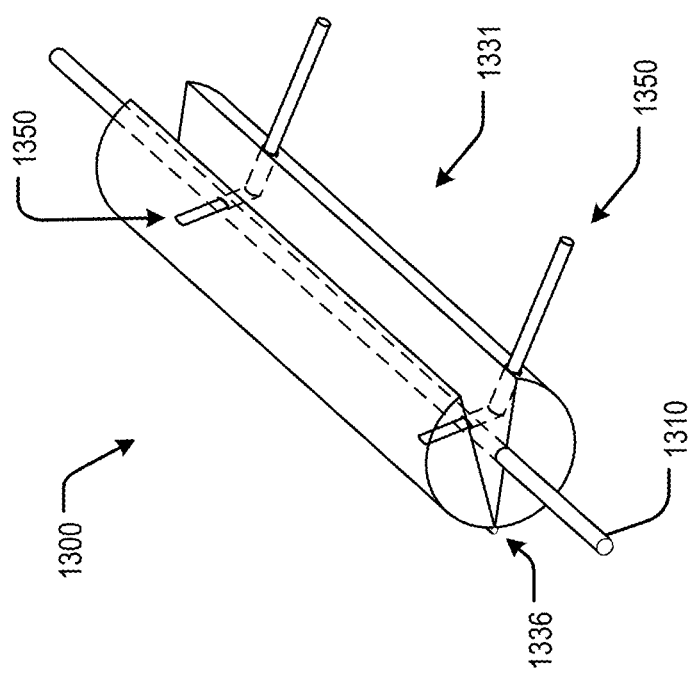
FIG. 13 is a schematic of a torque tool in an active position, according to an exemplary embodiment of the present disclosure.

According to an embodiment, FIG. 13 is an illustration of a torque tool employing a rope and pulley system. As shown in FIG. 13, the torque tool 1300 can include a hollow body 1331 and a series of ropes and pulleys 1350. The hollow body 1331 can be separable into two components that are rotatable connected a hinge 1336. The hollow body 1331 further comprises a working channel for receiving a catheter 1310. In an embodiment, the rope and pulley system can be engaged to bring the catheter 1310 into proximity with a lower component of the hollow body 1331. Subsequently, an upper component of the hollow body 1331 can be lowered about the hinge 1336 to secure the catheter 1310 within the working channel.

According to an embodiment, to operate the torque tool 1300, the hinge 1336 must be used to reveal the upper component, the lower component, and the working channel therein. The catheter 1310 can be placed within the working channel of the hollow body 1331, and the rope and pulley system 1350 can be adjusted so that the catheter 1310 is pinched between the rope and pulley system 1350 and the working channel of the hollow body 1331. Once the rope and pulley system 1350 is at the desired position, the upper component of the torque tool 1300 may be closed to lock the rope and pulley system 1350 in position to prevent movement. In order to reposition the catheter 1310, the torque tool 1300 may be reopened and the rope and pulley system 1350 may be adjusted to alter the force that is pushing on the catheter. In an example, the torque tool 1300 may be fabricated from a material including, among others, plastic and metal. In addition, the material can be biocompatible or sterilizable.

Figure 14A:
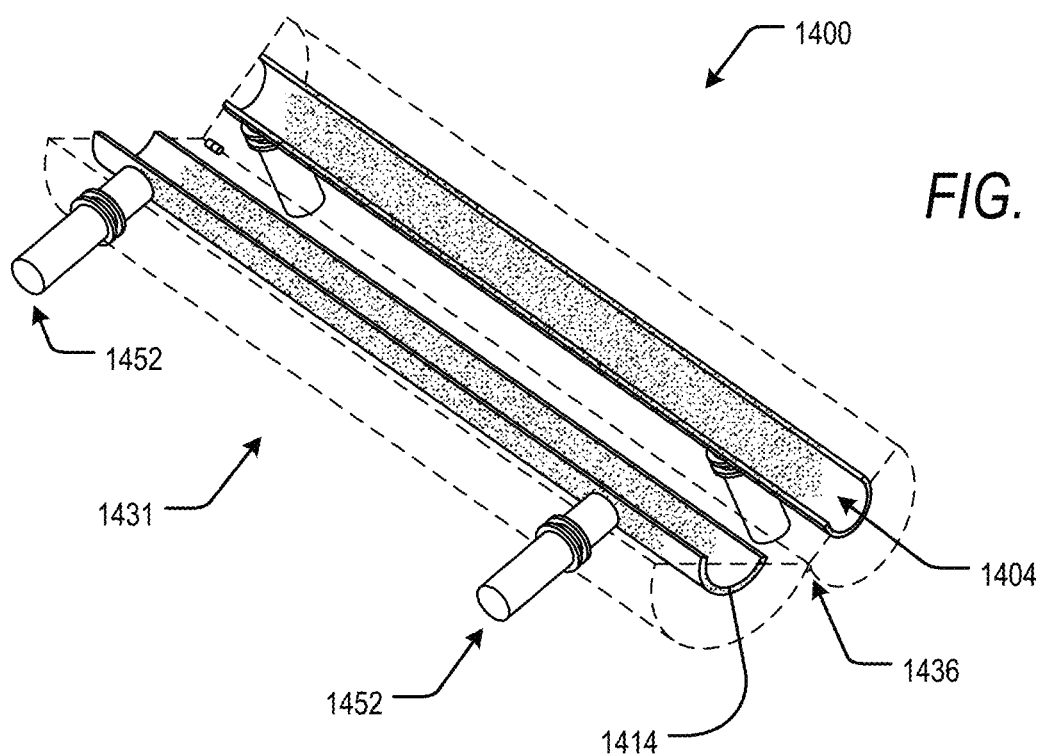
FIG. 14A is a schematic of a torque tool in an open position, according to an exemplary embodiment of the present disclosure.
Figure 14B:
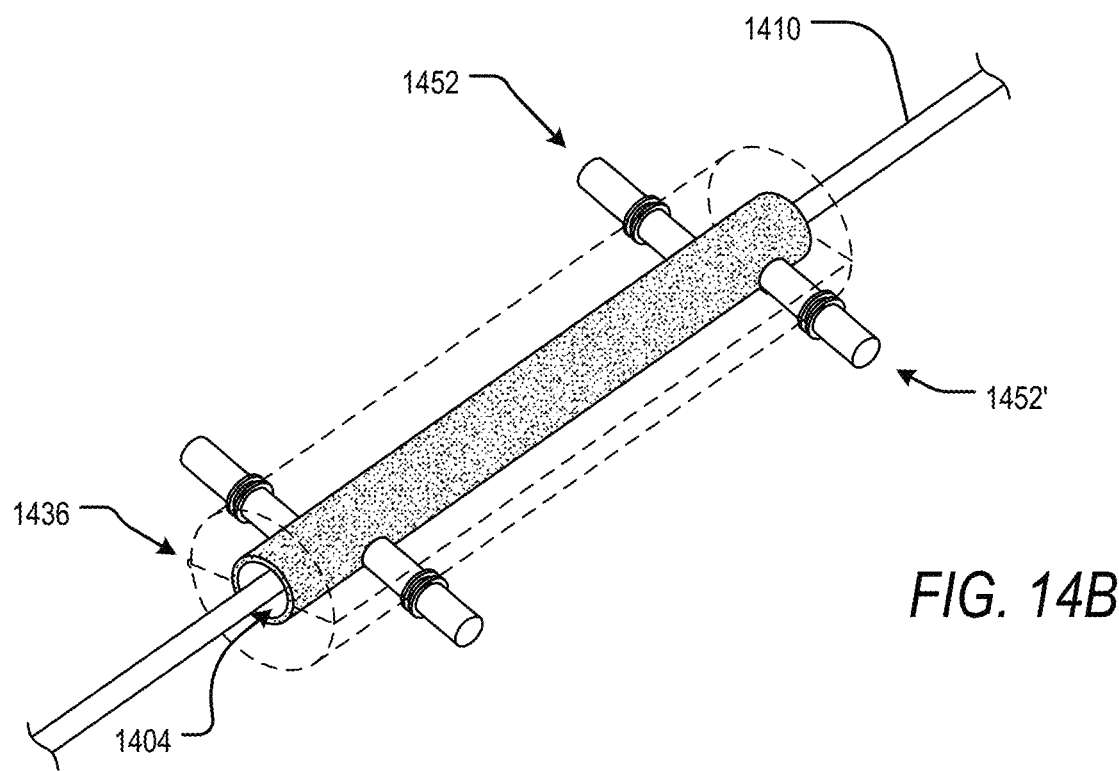
FIG. 14B is a schematic of a torque tool in a closed position, according to an exemplary embodiment of the present disclosure.

FIG. 14A and FIG. 14B provide illustrations of a torque tool 1400 employing at least one clamping feature 1452 to secure a catheter 1410 within a working channel 1404 of a hollow body 1431. In an example, the hollow body 1431 comprises two halves that are rotatable about a hinge 1436. The working channel 1404 of the torque tool 1400 can be lined with a tactile material 1414 that provides for enhanced control of the catheter 1410 house therein. Each of the at least one clamping feature 1452 can be squeeze to momentarily secure the catheter 1410 within the working channel 1404 or can be screwed through a wall of the hollow body 1431 in order to provide continuous pressure to a surface of the catheter 1410.

According to an embodiment, during operation, the hinge 1436 can be actuated to expose the working channel 1404 of the hollow body 1431, and the catheter 1410 may be placed inside. Once closing the hollow body 1431 so that the catheter 1410 is circumferentially surrounded, the at least clamping feature 1452 may be pushed on either side to create a pinching force on two or more points on the catheter 1410. Once the at least one clamping feature 1452 is in the desired position, the screw mechanisms may be utilized to lock the at least one clamping feature 1452 and ensure their placement. FIG. 14B provides an illustration of the torque tool 1400 of the present embodiment in a closed position.

Figure 15A:
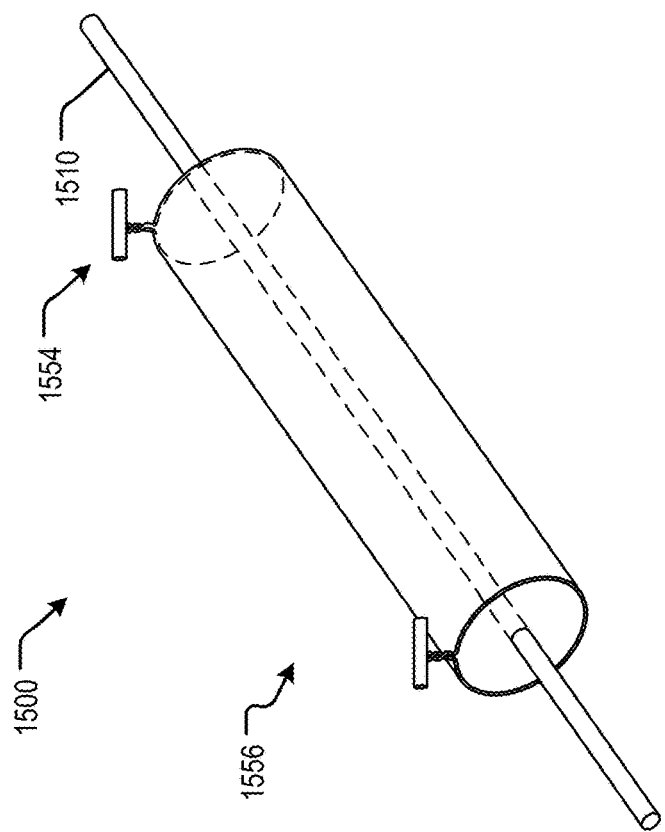
FIG. 15A is a schematic of a torque tool in an open position, according to an exemplary embodiment of the present disclosure.
Figure 15B:
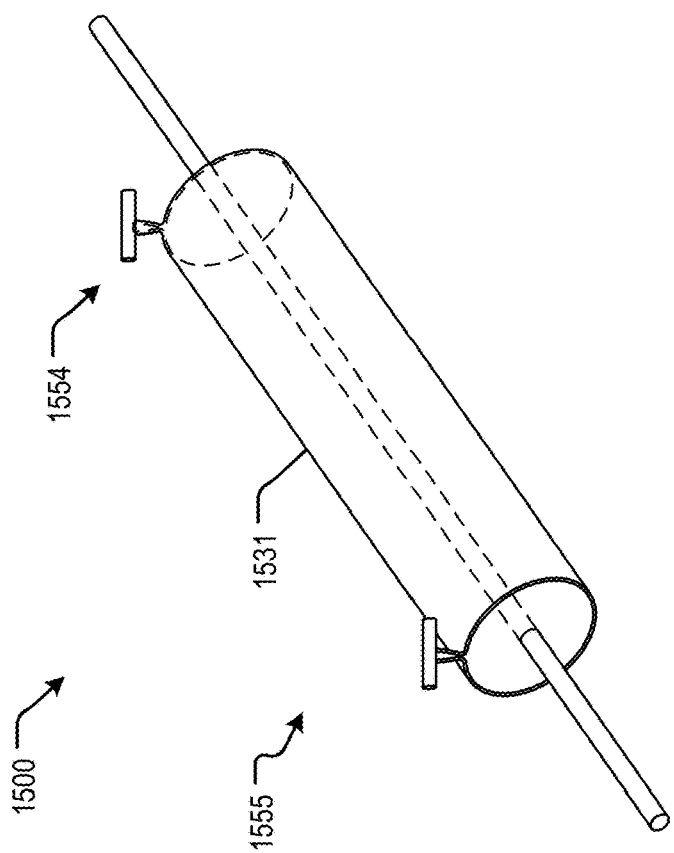
FIG. 15B is a schematic of a torque tool in a closed position, according to an exemplary embodiment of the present disclosure.

FIG. 15A and FIG. 15B

According to an embodiment, FIG. 15A and FIG. 15B provide illustrations of a torque tool of the present disclosure. The torque tool 1500 includes a hollow body 1531 having at least one twisting mechanism 1554 at each end of the hollow body 1531. During operation, the at least one twisting mechanism 1554 can be adjusted in order to secure a catheter 1510 within a working channel of the hollow body 1531. For example, the tightness of the at least one twisting mechanism 1554 can be adjusted by twisting each of the mechanisms. FIG. 15A provides an illustration of the torque tool 1500 of the present embodiment in an open position 1555.

In an example, having positioned the catheter 1510 within the hollow body 1531, the at least one twisting mechanism 1554 may be adjusted in order to securely fasten the catheter 1510 within the torque tool 1500. FIG. 15B provides an illustration of the torque tool 1500 of the present embodiment in a closed position 1556. In an embodiment, the hollow body 1531 can be fabricated from, for example, a malleable material that may be molded to the shape of the catheter. Accordingly, the malleable material can include, for instance, a silicone rubber or other elastomeric material that is biocompatible and/or sterilizable. In an embodiment, the at least one twisting mechanism 1554 can be fabricated from plastic and the like.

According to an embodiment, in order to reposition the catheter 1510 within the torque tool 1500, the at least one twisting mechanism 1554 can be easily loosened to allow for movement of the catheter 1510.

FIG. 16A and FIG. 16B provide illustrations of an embodiment of the present disclosure wherein a catheter is secured in position via an external clamp. As shown in FIG. 16A, a torque tool 1600 includes a hollow body 1631 having a working channel 1604 and one or more external clamps 1658 in an open position. A catheter 1610 can be inserted within the working channel 1604 of the hollow body 1631 by moving one or more external clamps 1658 about one or more corresponding springs 1636. With the one or more corresponding springs 1636 in an open position, the catheter 1610 can be positioned.

With the catheter 1610 in position within the working channel 1604 of the hollow tube 1631, the one or more corresponding springs 1636 may be released and the one or more external clamps 1658 can be engaged with a surface of the catheter 1610, securing it in place. In an embodiment, the correct strength of each of the one or more corresponding springs 1636 will be determined based on testing. In an example, each of the one or more corresponding springs 1636 is strong enough to secure the catheter 1610 without thereby damaging it and/or preventing passage of electrical current therethrough.

Figure 17B:
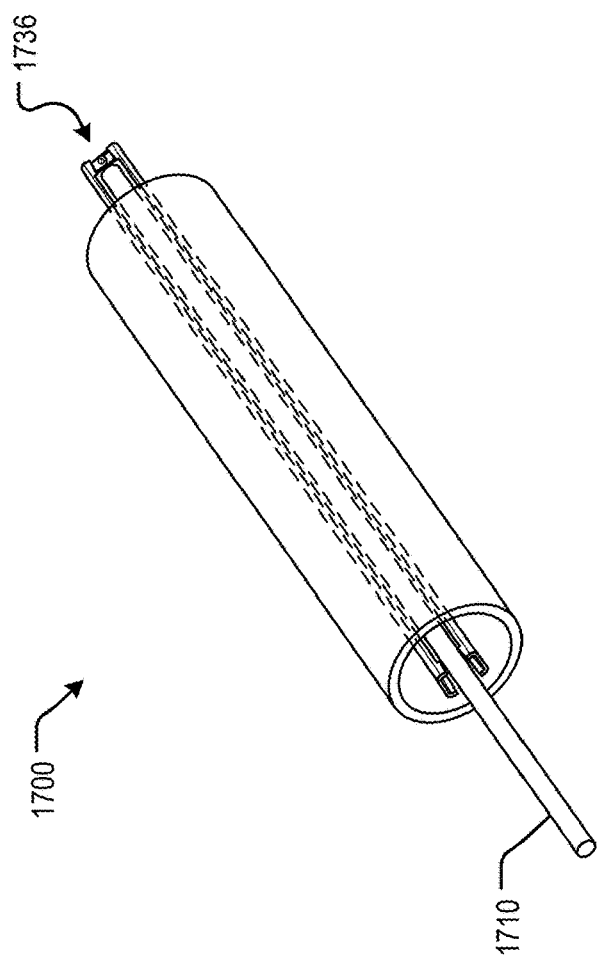
FIG. 17B is a schematic of a torque tool in a closed position, according to an exemplary embodiment of the present disclosure.
Figure 17A:
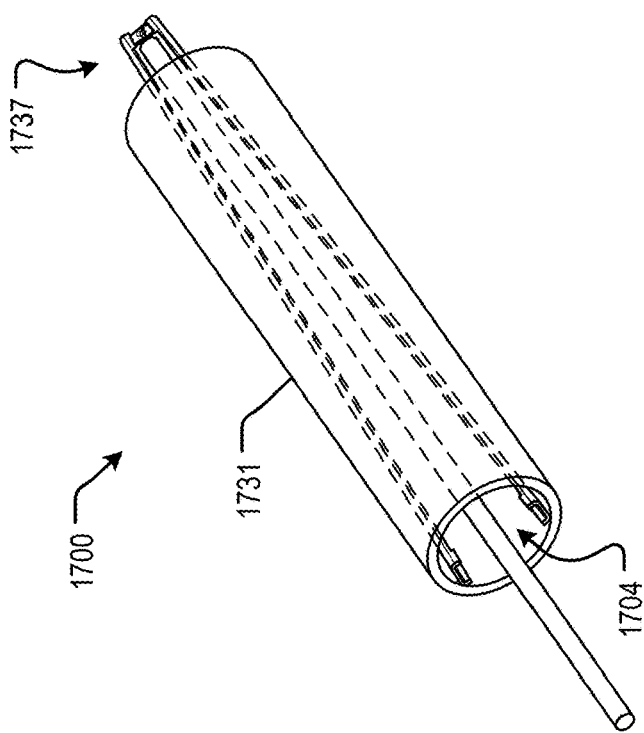
FIG. 17A is a schematic of a torque tool in an open position, according to an exemplary embodiment of the present disclosure.

Similarly to FIG. 16A and FIG. 16B, FIG. 17A and FIG. 17B provide illustrations of an embodiment of the present disclosure wherein a catheter is secured in position via an internal clamp. As shown in FIG. 17A, a torque tool 1700 includes a hollow body 1731 having a working channel 1704 and one or more internal clamps, or squeezing features 1737, in an open position. A catheter 1710 can be inserted within the working channel 1704 of the hollow body 1731 by engaging the one or more squeezing features 1737 of the torque tool 1700 to allow for passage of the catheter 1710 therein.

With the catheter 1710 in position, as shown in FIG. 17B, the one or more squeezing features 1737 can be release to allow the one or more internal clamps to secure the catheter 1710 within the working channel 1704 of the hollow body 1731. In an example, the clamping mechanism of the one or more internal clamps is provided by a one or more corresponding springs 1736.

As above, in an embodiment, the correct strength of each of the one or more corresponding springs 1736 will be determined based on testing. In an example, each of the one or more corresponding springs 1736 is strong enough to secure the catheter 1710 without thereby damaging it and/or preventing passage of electrical current therethrough.

Figure 18B:
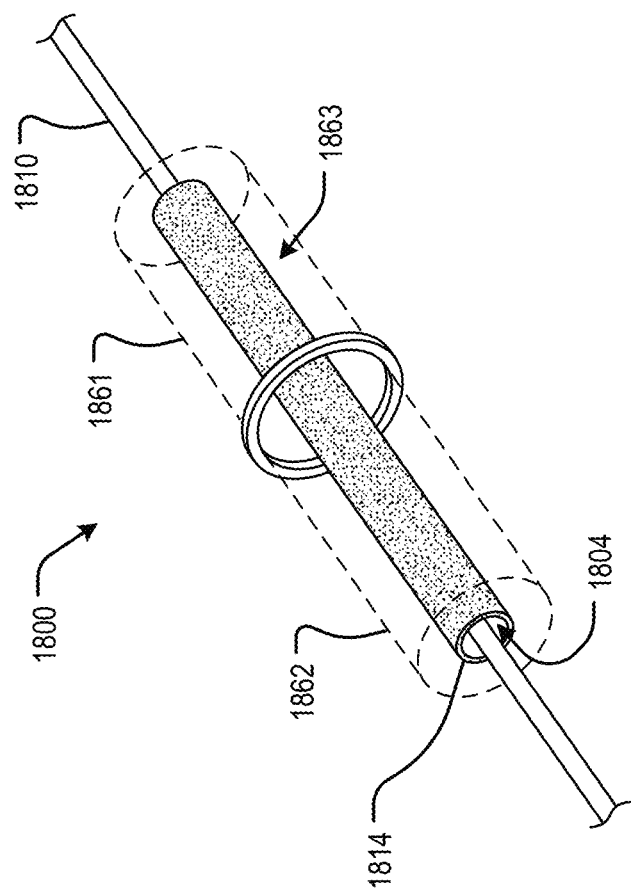
FIG. 18B is a schematic of a torque tool, according to an exemplary embodiment of the present disclosure.
Figure 18A:
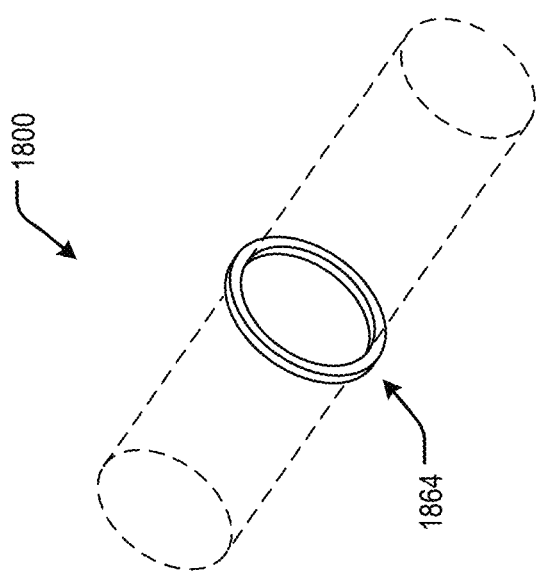
FIG. 18A is a schematic of a torque tool, according to an exemplary embodiment of the present disclosure.

FIG. 18A and FIG. 18B provide illustrations of a torque tool of the present disclosure, wherein the catheter is secured within the working channel of the hollow body by a twisting mechanism. FIG. 18A is an illustration of a torque tool 1800 having a rotating feature 1864. As shown in FIG. 18B, the torque tool 1800 further includes a first outer casing 1861, a second outer casing 1862, and an inner casing 1863. The inner casing 1863 can define a working channel 1804 and be covered with a tactile material 1814 for gripping a catheter 1810 positioned therein.

In an example, the inner casing 1863 can be a soft material such as a silicone rubber or other elastomer. By using a softer material to surround the catheter 1810, the possibility for electrical current impedance decreases, and the risk of crushing the catheter 1810 also decreases. The remainder of the torque tool 1800 may be made out of a material including, among others, metal or elastomer, and may be biocompatible and/or sterilizable.

The rotating mechanism 1864 that is located in the center of the torque tool 1800 can be rotated in order to secure the catheter 1810 in position. For instance, after placing the catheter 1810 into the working channel 1804 of the torque tool 1800, the rotating mechanism 1864 may be twisted, thereby rotating the first outer casing 1861 relative to the second outer casing 1862, and thereby tightening the inner casing 1863 around the catheter 1810. In an example, the torque tool 1800 can then provide sufficient force to grip onto the catheter 1800 and prevent slippage during use.

According to an embodiment, the first outer casing 1861 and the second outer casing 1862 can be a hard plastic and the inner casing 1863 can be a soft silicone portion, or other elastomer, for contact with the catheter 1810.

Figure 19:
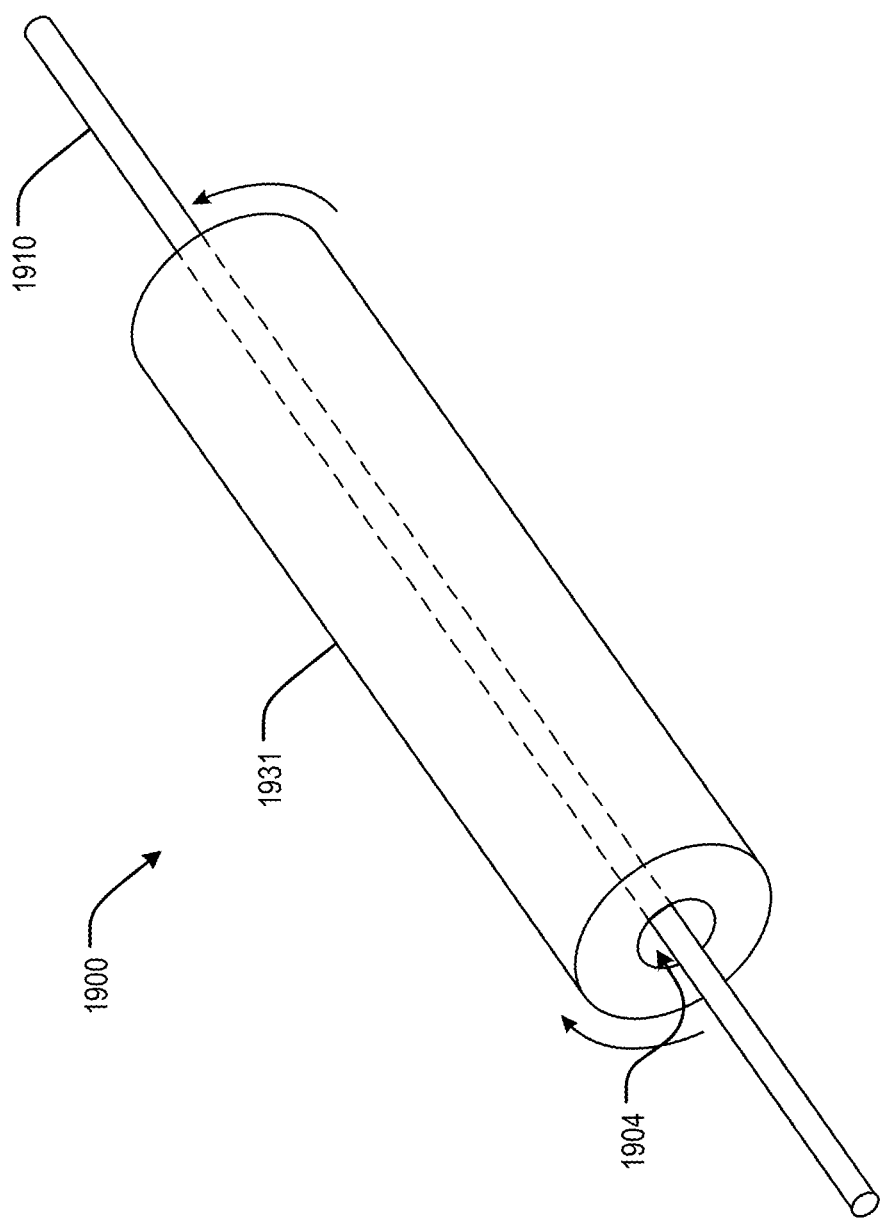
FIG. 19 is a schematic of a torque tool, according to an exemplary embodiment of the present disclosure.

FIG. 19 provides an illustration of a torque tool 1900 comprising an all-in-one design with a rotation feature. Similarly to FIG. 18A and FIG. 18B, by rotating opposite ends of a hollow tube 1931 of the torque tool 1900, a diameter of a working channel 1904 can be decreased until contact with a catheter 1910 therein is made, thereby securing the catheter 1910 for sub sequent manipulation.

As part of the present disclosure, a specific example of a torque tool, and an implementation thereof, is included below. The example, considered in view of FIG. 3A through FIG. 5C of the present disclosure; is meant for illustrative purposes only and is not intended to limit the invention. Those of ordinary skill in the art will readily recognize parameters that can be changed or modified to yield essentially the same results.

EXAMPLE

The present disclosure describes a torque tool that radially distributes a compressive force applied by a physician in order to prevent damage to internal electronics necessary for ablation catheters.

Figure 20:
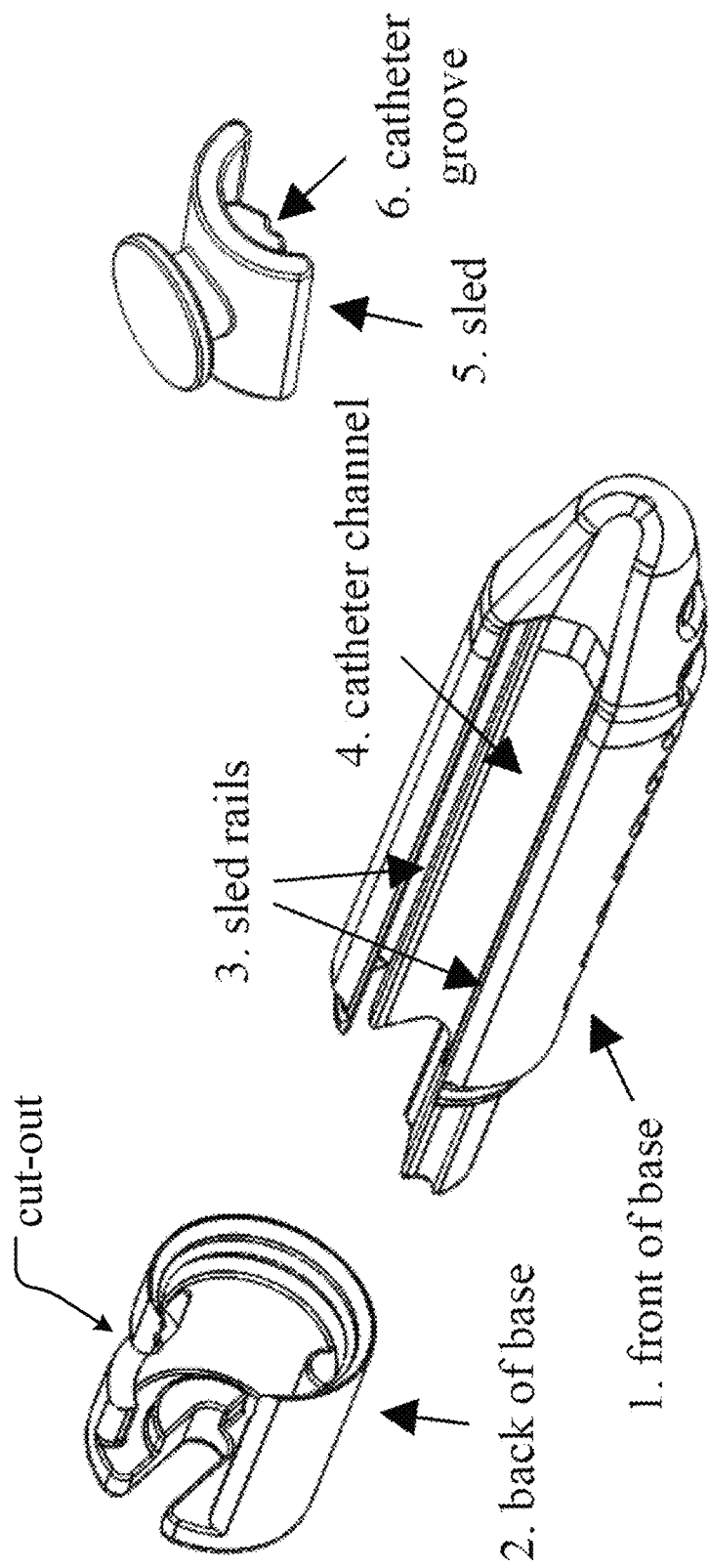
FIG. 20 is an exploded schematic of a torque tool, according to an exemplary embodiment of the present disclosure.

In the non-limiting Example described below, the torque tool, which may be interchangeably referred to as a catheter grip tool, may have a base and a sled, or sliding sled, as in FIG. 20. The base may be a two-part base, including a 'back of base' and a 'front of base' that securely snap together in the manufacturing process. The 'front of base' includes two parallel rails, or sled rails, that allow a sled to slide forward and backward within the torque tool. The 'back of base' includes a cut-out that allows the sled to be pulled aside, radially, to allow a catheter to be positioned within the torque tool. The 'front of base' includes a semi-circular catheter channel having, in an example, a radius of 1.5 mm and a slope, relative to the two parallel rails, of 3.33°. In order to provide sufficient surface area for physician contact during manipulation, an outer diameter of the base may be 17 mm. The sled may be designed to slide along the two parallel rails of the base. The bottom of the sled may have a catheter groove parallel to the catheter channel and may be designed to radially distribute compressive forces along a length of, and/or around the diameter of, the catheter body. The sloped features of the catheter channel and catheter groove, respective of the two parallel rails of the base, results in the catheter channel and the catheter groove converging as the sled is advanced forward from the 'back of base'. In this way, the torque tool may be applied to a variety of catheter sizes ranging from 3 French to 9 French.

Prototypes of the tool were 3D printed by digital light synthesis (DLS) using a biocompatible rigid polyurethane (Carbon Resin RPU 70, Carbon, Redwood City, CA), that has been tested by the manufacturer in accordance with ISO 10993-5 and ISO 10993-10 and determined to be suitable for prolonged tissue contact (more than 30 days) and short-term mucosal membrane contact (up to 24 hours).

During implementation, and after the catheter has been inserted through a sheath into the vasculature and positioned within the endocardial space, the torque tool can be brought onto the surgical field in an open state. The torque tool, in the open state, can be affixed to the catheter, as in FIG. 21A.

The torque tool may be positioned about 2 inches to 6 inches distal to the vasculature access sheath. Having affixed the torque tool about the catheter, the sled may be rotated 90° in order to bring the torque tool into a closed, inactive state. As shown in FIG. 21B, the torque tool in this position has not engaged the catheter but is able to be slid forward from the 'back of base' of the torque tool. As shown in FIG. 21C, the sled may then be slid forward, along the slanted slide rails, until the sled is secured around the catheter. Once secured, the tool can be used, as shown in FIG. 21D, to steer the catheter with finer manipulation.

Use cases of the torque tool include arrhythmia-related ablation. For instance, after the source of an arrhythmia has been identified, the torque tool may be used to maintain stable catheter tip position while radiofrequency energy is used to create a lesion. This process may be repeated for multiple lesions until a successful ablation is achieved. If necessary, the torque tool can be removed from the catheter and placed in a different location to advance the catheter deeper into the heart. The torque tool can also be placed on different catheters including diagnostic catheters and catheterization catheters during the procedure, and/or multiple torque tools can be used simultaneously and/or sequentially.

In order to evaluate the likely performance of the torque tool during a procedure, as in the arrhythmia ablation described above, the torque tool was performance tested in the lab.

Figure 22:
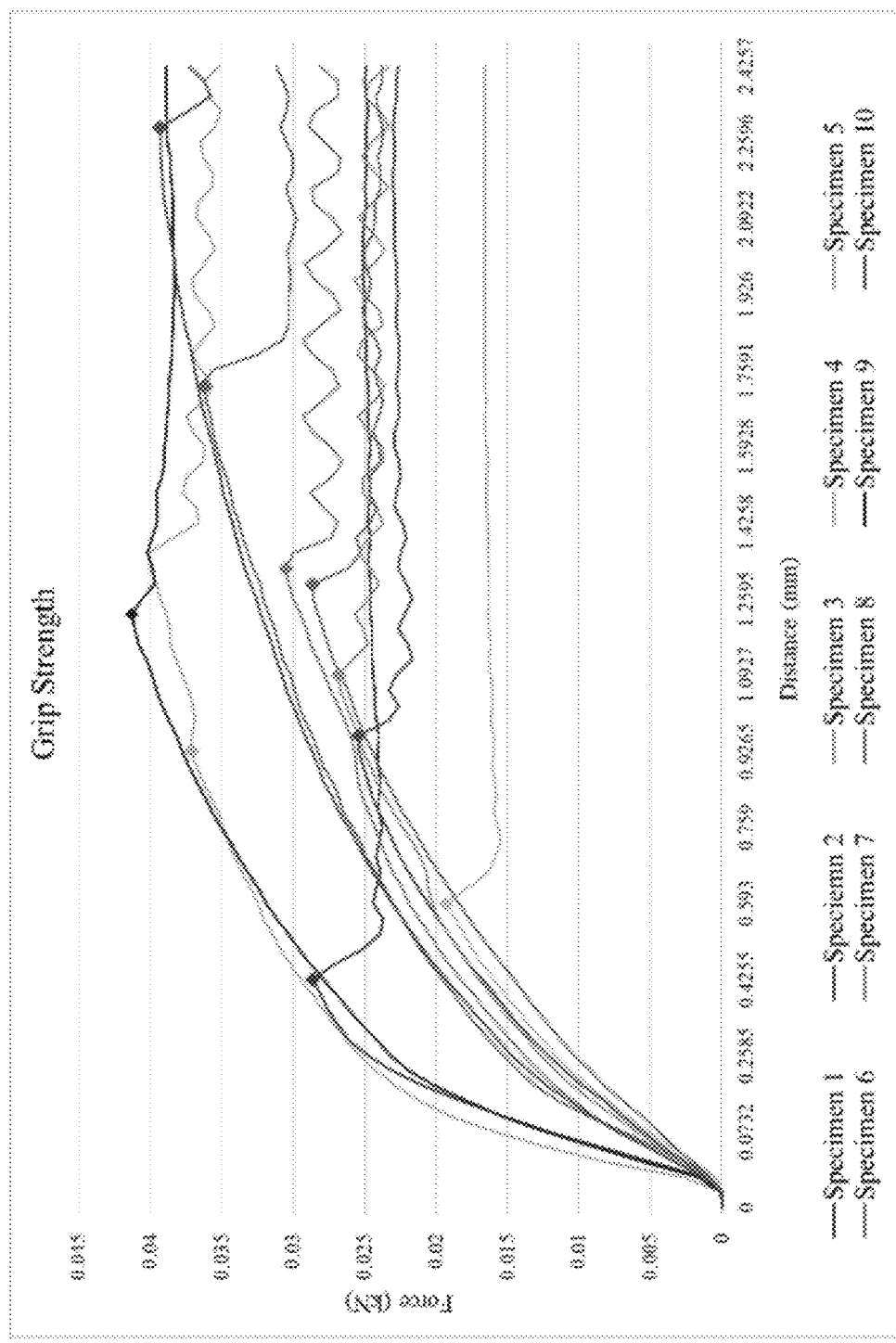
FIG. 22 is a graphical representation of slip performance of a torque tool, according to an exemplary embodiment of the present disclosure.

First, in order to demonstrate that the torque tool would not slip when pushing the catheter into or pulling it out of the body, the grip strength of the tool must exceed the observed forces during catheterization. To quantify grip strength, the torque tool was attached to a standard 7 French catheter (Biosense Webster, Diamond Bar, CA) and an axial force was applied to the torque tool. The average grip strength was defined as the maximum force prior to slip between the torque tool and the catheter when the axial force was applied (n=10 samples). Prior to testing, three cardiac electrophysiologists familiar with the torque tool were asked to place the torque tool on a catheter and tighten it to the point where they felt it was secure enough to use during a procedure. The distance each physician advanced the sled was measured and averaged to determine a standard sled position for testing. On an Instron 5965 Series Machine (Instron, Norwood, MA) with a 5 kN load cell and manual grips, the catheter was placed in the lower grip at the spot where it exits at the tip of the torque tool, and the torque tool was placed in the upper grip. To replicate the catheter being removed from the body, the torque tool was pulled with a constant, positive displacement of 100 mm/min until the first drop in force was observed. As shown in FIG. 22, the torque tool began to slip at an average force of 0.031±0.00696 kN. This grip strength is approximately 10 times greater than the peak force needed to insert a catheter into a vessel, indicating that the torque tool will not slip when used during catheterization.

Figure 23:
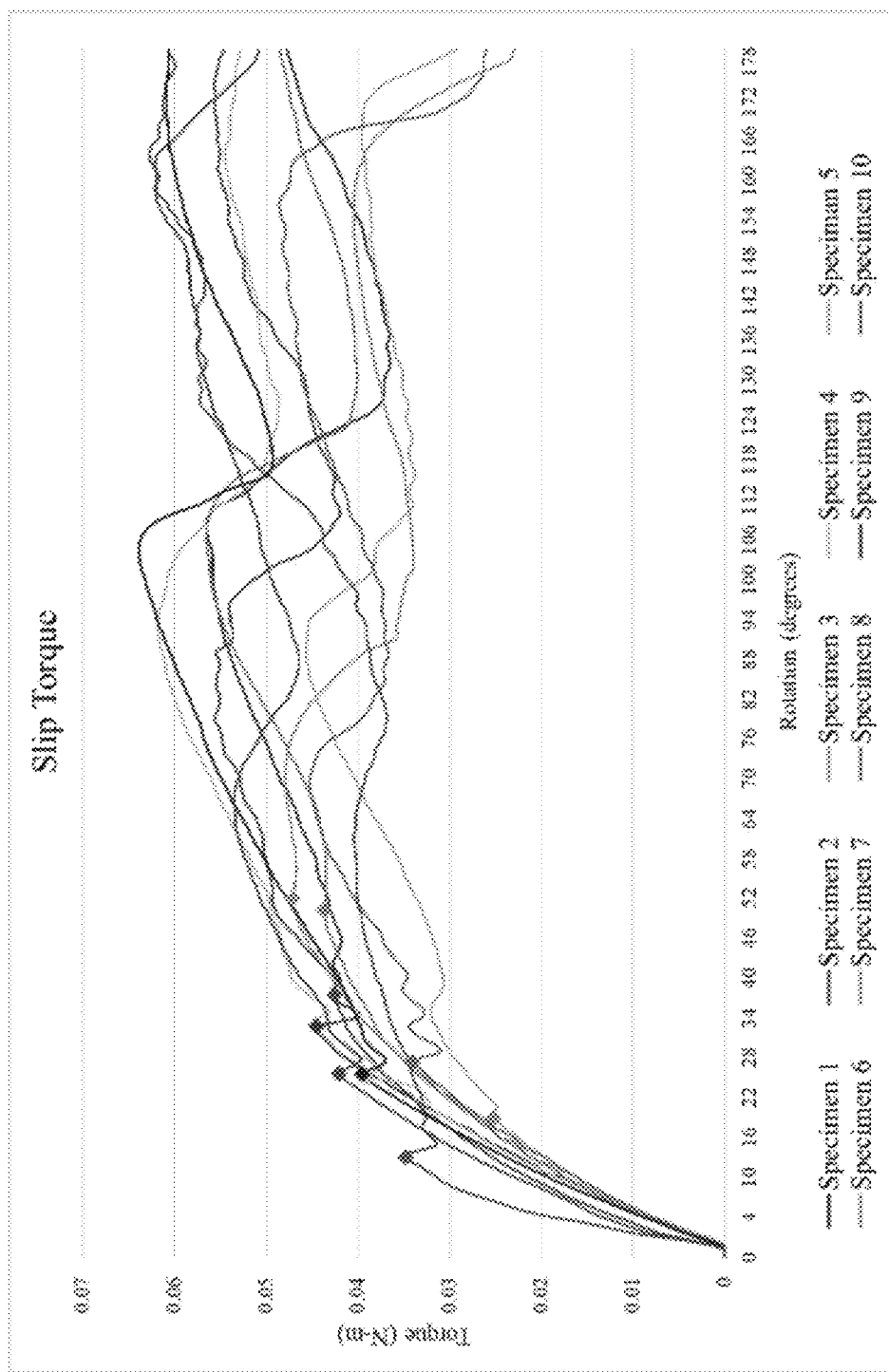
FIG. 23 is a graphical representation of torque performance of a torque tool, according to an exemplary embodiment of the present disclosure.

Second, the torque tool was tested to determine a maximal torque the torque tool could withstand before allowing a catheter to slip. An Instron 5965 Series Machine (Instron, Norwood, MA) was used with a 4505N/5N-m load cell and a manual chuck lower grip and manual upper grip. The torque tool was placed on the catheter with the sled advanced to the standard distance previously determined according to positioning by cardiac electrophysiologists. The catheter was then clamped in the lower chuck grip and the torque tool was clamped in the upper manual grip. The Instron 5965 Series Machine was then used to rotate the torque tool clockwise at 5.00 revolutions per minute while the catheter remained stationary to simulate a user twisting the catheter in the heart (n=10 samples). The slip torque was defined as the maximum torque prior to the first observed drop in torque. As shown in FIG. 23, the average slip torque was 0.0392±0.00642 N-m and occurred at an average rotation of 32±12°. This slip torque is nearly 5 times greater than the max torque exhibited when rotating a catheter within a vessel, indicating that the torque tool will not slip under normal clinical conditions.

Figure 24:
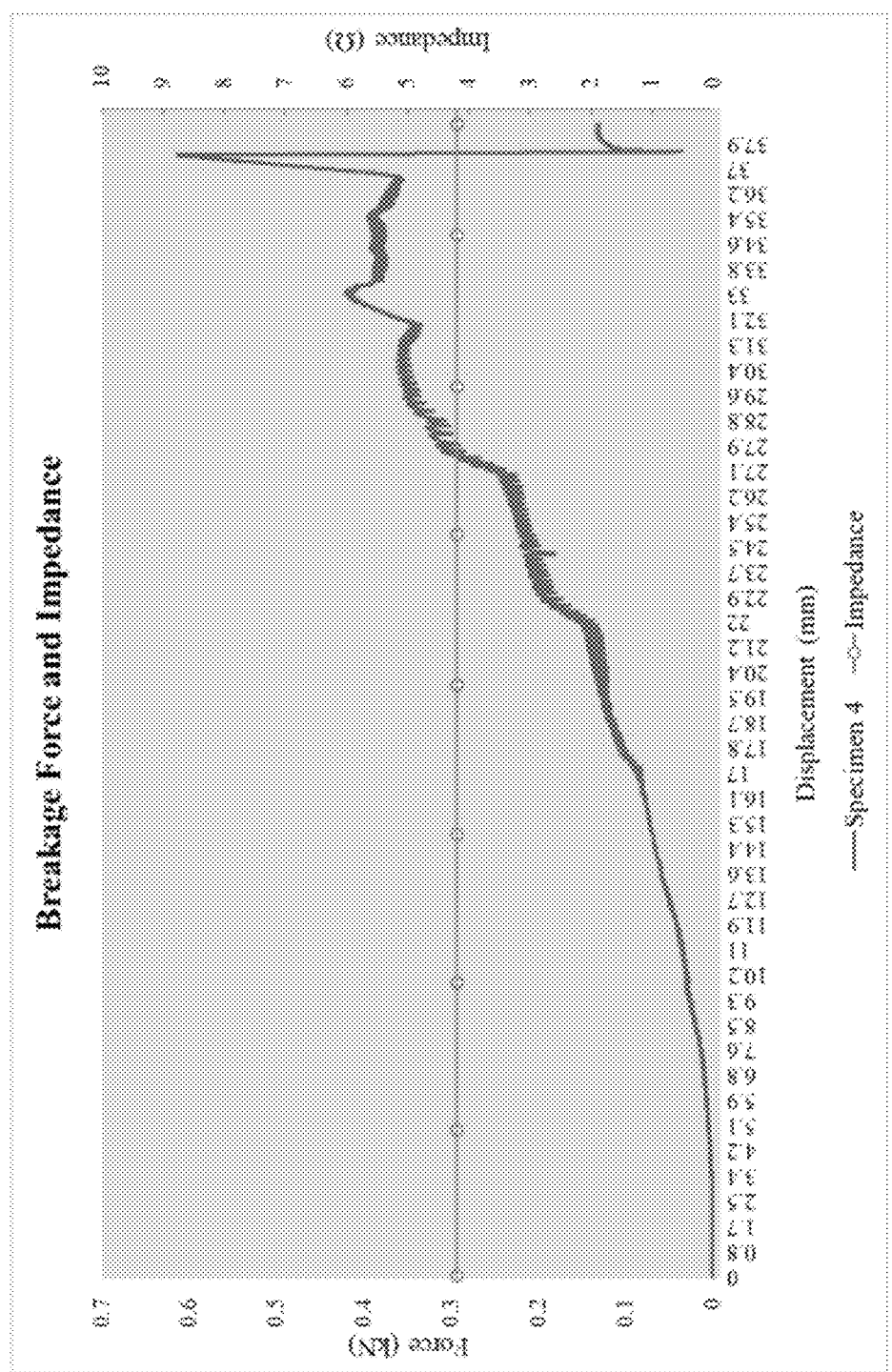
FIG. 24 is a graphical representation of breakage performance of a torque tool, according to an exemplary embodiment of the present disclosure.

Third, the torque tool was tested to demonstrate that, at maximum grip strength, the torque tool will fracture before damage of internal electronics of the catheter is allowed to occur. To measure electrical performance of the catheter under maximum grip strength, a function generator (Tektronix, Beaverton, OR) simulating an ablation waveform was used to deliver a radiofrequency signal to the tip of the catheter, and the signal was recorded using LabVIEW (National Instruments, Austin, TX). An Instron 5965 Series Machine (Instron, Norwood, MA) was set up with a 5 kN load cell, lower chuck grip, and upper compression plate. The torque tool was loosely placed on the catheter and the tip of the torque tool was secured in the chuck. A sleeve was placed over the torque tool and the compression plate was advanced at 10 mm/min, pushing the sled forward and tightening the torque tool on the catheter. Electrical resistance of the catheter was recorded at every 5 mm of displacement, while the simulated ablation waveform was recorded continuously. In this experiment, the sled experienced failure at an average force of 0.554±0.0972 kN, which is approximately 1.75 times greater than the force that can be generated by a human, while the average electrical resistance at the start of the test was 4.21±0.26 ohms and 4.20±0.24 ohms at the end of the test, as shown in FIG. 24 (n=10 samples). A t-test assuming equal variance was performed on the starting values and the finishing values of resistance and no statistically significant difference was observed (p=0.465). The same statistical test was performed with the average starting amplitude and the average ending amplitude of the simulated ablation waveform (7.807±0.56 V and 7.805±0.56 V), with no significant difference being observed therebetween (p=0.497). These results indicate that catheter performance remains unchanged under maximum grip strength.

Fourth, to demonstrate whether the torque tool could successfully rotate the catheter as well as, or better, than manual finger rotation, a study was designed to measure the angle of rotation of the catheter tip when a specified angle of rotation was applied. To simulate femoral venous access to the heart, the catheter was inserted through a 2 foot piece of rubber tubing until the tip of the catheter emerged from the distal end of the rubber tubing. The tip of the catheter was then locked in the deflected state at 0° of rotation. The catheter was rotated to 90° and 180° using both manual finger pinch rotation and by using the torque tool to rotate the catheter. The degree of deflection at the tip from the zero point was measured using a protractor placed behind the tip. When rotating the catheter with the torque tool, the torque tool was able to translate 100% of the rotation to the catheter tip for both 90° and 180° of rotation. When rotating the catheter with finger pinch, only 60% of the rotation was translated to the tip when 90° of rotation was applied and only 86% of the rotation when 180° of rotation was applied, as shown in Table 1 (n=5 samples). Statistical analysis with two sample t-test showed rotation with the torque tool was significantly more accurate than finger pinch rotation for both 90° of rotation and 180° of rotation (p<0.01).

TABLE 1

| | Average Recorded Degree of Tip Rotation | |
|---|---|---|
| | Finger Pinch Rotation | Torque Tool Rotation |
| 90° rotation | 54° ± 6.5 | 90° ± 0 |
| 180° rotation | 155° ± 7.1 | 180° ± 0 |

According to an embodiment of the present disclosure, the above-described non-limiting Example demonstrates a torque tool and workflow thereof to provide improved control and maneuverability in pediatric cardiac ablation procedures. The torque tool can grip catheters with forces in excess of clinical conditions without damaging the internal electronics of the catheter. Exemplary data demonstrates that the torque tool performance exceeds normal use conditions, while the output signal and resistance of the catheter are not altered in advance of torque tool failure. In a simulated use study, the torque tool was able to more accurately translate torque than manual finger manipulation of the catheter. The torque tool can improve the safety profile of ablation procedures by creating a more ergonomic environment and reducing physician muscle fatigue.

Embodiments of the present disclosure may also be as set forth in the following parenthetical s.

(1) An apparatus for controlling a cylindrical medical device, comprising a bottom component having a working channel and one or more fingers comprising a sliding track, each of the one or more fingers having a top surface, a side surface, and a bottom surface, and a top component having one or more slots corresponding to the one or more fingers comprising the sliding track, the top component being slidable along the sliding track, wherein the sliding track comprising gradations along the top surface of each of the one or more fingers, said gradations allowing the top component to reversibly slide in a step-wise manner from a rearward end of the apparatus to a forward end of the apparatus, the sliding track is declined from the rearward end of the bottom component to the forward end of the bottom component, a distance from a bottom surface of each of the one or more fingers to a surface of the working channel decreasing, accordingly, along a working axis of the bottom component, and the top component, upon being slid along the sliding track from the rearward end of the apparatus to the forward end of the apparatus, is frictionally engaged with the cylindrical medical device, said cylindrical medical device being secured therein.

(2) The apparatus according to (1), wherein the bottom component includes a protrusion extending from the side surface of each of the one or more fingers.

(3) The apparatus according to either (1) or (2), wherein a surface of the working channel is covered with an elastomer.

(4) The apparatus according to any of (1) to (3), wherein a bottom surface of the top component is covered with an elastomer.

(5) The apparatus according to any of (1) to (4), wherein an external surface of the bottom component is covered with an elastomer.

(6) The apparatus according to any of (1) to (5), wherein, during sliding of the top component along the sliding track from the rearward end of the apparatus to the forward end of the apparatus, torque is transferred to the cylindrical medical device in a 1:1 relationship.

(7) The apparatus according to any of (1) to (6), wherein the top component includes an engaging surface, said engaging surface defining an engaging aspect of the top component, said engaging aspect being a depression having a curved shape along a cross section.

(8) The apparatus according to any of (1) to (7), wherein the top component includes an engaging surface, said engaging surface defining an engaging aspect of the top component, said engaging aspect being a projection having a curved shape along a cross section.

(9) The apparatus according to any of (1) to (8), wherein the surface of the working channel of the bottom component defines a working channel feature, said working channel feature being a depression having a curved shape along a cross section.

(10) The apparatus according to any of (1) to (9), wherein the top component further includes a tactile feature along a top surface, the tactile feature including a series of alternating ribs having a rectangular shape.

(11) The apparatus according to any of (1) to (10), wherein the apparatus is used to maneuver or position the cylindrical medical device to a specific region within a heart or vascular space to perform a diagnostic study or deliver therapy.

(12) The apparatus according to any of (1) to (11), wherein the top component includes a tactile tab, said tactile tab being a normal projection at a forward end of the top component.

(13) An apparatus for controlling a cylindrical medical device, comprising a bottom component having a working channel and one or more fingers comprising a sliding track, each of the one or more fingers having a top surface, a side surface, and a bottom surface, and a top component having one or more slots corresponding to the one or more fingers comprising the sliding track, the top component being slidable along the sliding track, wherein the sliding track comprising gradations along the top surface of each of the one or more fingers, said gradations allowing the top component to reversibly slide in a step-wise manner from a rearward end of the apparatus to a forward end of the apparatus, the sliding track is declined from the rearward end of the bottom component to the forward end of the bottom component, a distance from a bottom surface of each of the one or more fingers to a surface of the working channel decreasing, accordingly, along a working axis of the bottom component, the top component, upon being slid along the sliding track from the rearward end of the apparatus to the forward end of the apparatus, is frictionally engaged with the cylindrical medical device, said cylindrical medical device being secured therein, the top component includes an engaging surface, said engaging surface defining an engaging aspect of the top component, said engaging aspect being a depression having a curved shape along a cross section, and the surface of the working channel of the bottom component defines a working channel feature, said working channel feature being a depression having a curved shape along a cross section.

(14) The apparatus according to (13), wherein the bottom component includes a protrusion extending from the side surface of each of the one or more fingers.

(15) The apparatus according to either (13) or (14), wherein a surface of the working channel is covered with an elastomer.

(16) The apparatus according to any of (13) to (15), wherein a bottom surface of the top component is covered with an elastomer.

(17) The apparatus according to any of (13) to (16), wherein an external surface of the bottom component is covered with an elastomer.

(18) The apparatus according to any of (13) to (17), wherein, during sliding of the top component along the sliding track from the rearward end of the apparatus to the forward end of the apparatus, torque is transferred to the cylindrical medical device in a 1:1 relationship.

(19) The apparatus according to any of (13) to (18), wherein the top component further includes a tactile feature along a top surface, the tactile feature including a series of alternating ribs having a rectangular shape.

(20) An apparatus for controlling a cylindrical medical device, comprising a bottom component having a working channel and one or more fingers comprising a sliding track, each of the one or more fingers having a top surface, a side surface, and a bottom surface, and a top component having one or more slots corresponding to the one or more fingers comprising the sliding track, the top component being slidable along the sliding track, wherein the top component, upon being slid along the sliding track from the rearward end of the apparatus to the forward end of the apparatus, is frictionally engaged with the cylindrical medical device, said cylindrical medical device being secured therein, the top component includes an engaging surface, said engaging surface defining an engaging aspect of the top component, said engaging aspect being a depression having a curved shape along a cross section, and a surface of the working channel of the bottom component defines a working channel feature, said working channel feature being a depression having a curved shape along a cross section.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. An apparatus for controlling a cylindrical medical device, comprising:
   a bottom component having a curved outer surface forming a body of the bottom component, a working channel, and one or more fingers comprising a sliding track, each of the one or more fingers having a top surface, a side surface, and a bottom surface; and
   a top component having one or more slots corresponding to the one or more fingers comprising the sliding track, the top component being slidable along the sliding track, wherein
   the top component, upon being slid along the sliding track from a rearward end of the apparatus to a forward end of the apparatus, is frictionally engaged with the cylindrical medical device, said cylindrical medical device being secured therein,
   the top component includes an engaging surface, said engaging surface defining an engaging aspect of the top component, said engaging aspect having a curved shape along a cross section perpendicular to a longitudinal axis of the top component, and
   a surface of the working channel of the bottom component defines a working channel feature, said working channel feature being a depression having a curved shape along a cross section,
   wherein the engaging aspect is a depression having the curved shape along the cross section.

2. The apparatus according to claim 1, wherein the surface of the working channel is covered with an elastomer.

3. The apparatus according to claim 1, wherein a bottom surface of the top component is covered with an elastomer.

4. The apparatus according to claim 1, wherein an external surface of the bottom component is covered with an elastomer.

5. The apparatus according to claim 1, wherein, during sliding of the top component along the sliding track from the rearward end of the apparatus to the forward end of the apparatus, torque is transferred to the cylindrical medical device in a 1:1 relationship.

* * * * *